United States Patent
Chung et al.

(10) Patent No.: US 12,289,238 B2
(45) Date of Patent: Apr. 29, 2025

(54) PASSIVE MEASUREMENT OF COMMUNICATION FLOWS

(71) Applicant: Viasat, Inc., Carlsbad, CA (US)

(72) Inventors: Jae Won Chung, Lexington, MA (US); Ankitkumar N. Patel, Carlsbad, CA (US); Girish Chandran, Carlsbad, CA (US); Anil K. Agarwal, North Potomac, MD (US)

(73) Assignee: Viasat, Inc., Carlsbad, CA (US)

( * ) Notice: Subject to any disclaimer, the term of this patent is extended or adjusted under 35 U.S.C. 154(b) by 342 days.

(21) Appl. No.: 17/791,843

(22) PCT Filed: Feb. 3, 2021

(86) PCT No.: PCT/US2021/016485
§ 371 (c)(1),
(2) Date: Jul. 8, 2022

(87) PCT Pub. No.: WO2021/158711
PCT Pub. Date: Aug. 12, 2021

(65) Prior Publication Data
US 2023/0037623 A1 Feb. 9, 2023

Related U.S. Application Data

(60) Provisional application No. 62/970,104, filed on Feb. 4, 2020.

(51) Int. Cl.
*H04L 47/11* (2022.01)
*H04L 47/12* (2022.01)
*H04L 47/30* (2022.01)

(52) U.S. Cl.
CPC ............. *H04L 47/11* (2013.01); *H04L 47/12* (2013.01); *H04L 47/30* (2013.01)

(58) Field of Classification Search
None
See application file for complete search history.

(56) References Cited

U.S. PATENT DOCUMENTS

| | | |
|---|---|---|
| 7,561,517 B2 | 7/2009 | Klinker et al. |
| 7,937,470 B2 | 5/2011 | Curley et al. |
| | (Continued) | |

FOREIGN PATENT DOCUMENTS

| | | |
|---|---|---|
| CN | 101572634 B | 7/2011 |
| EP | 2869516 A1 | 5/2015 |
| | (Continued) | |

OTHER PUBLICATIONS

International Search Report and Written Opinion, PCT/US2021/016485 dated Feb. 3, 2021.

*Primary Examiner* — Fadi Haj Said
(74) *Attorney, Agent, or Firm* — Holland & Hart LLP

(57) ABSTRACT

Methods, systems, and devices for communications are described. One or more flows between a node and one or more other nodes in a communication network may be monitored over a time period. During the monitoring, it may be identified that, during a subset of the time period, communications over at least one of the flows were restricted by the communication network based on receiving at least one indicator of congestion for the at least one flow. A quantity of traffic communicated over the one or more flows during the subset of the time period may then be determined, and respective flow rates of the one or more flows may be obtained. The obtained flow rates may be used to calculate a data rate of one or more connections between the node and the one or more other nodes.

21 Claims, 8 Drawing Sheets

(56) References Cited

U.S. PATENT DOCUMENTS

| | | |
|---|---|---|
| 8,923,270 B2 | 12/2014 | Lee et al. |
| 9,154,396 B2 | 10/2015 | Gondi et al. |
| 2012/0110012 A1 | 5/2012 | Borsos et al. |
| 2014/0086059 A1* | 3/2014 | Jiang ................... H04L 47/13 370/236 |
| 2016/0127238 A1* | 5/2016 | McCollum ............. H04L 47/12 709/224 |
| 2017/0359735 A1 | 12/2017 | Jain et al. |
| 2020/0028756 A1 | 1/2020 | Hale et al. |
| 2020/0314017 A1* | 10/2020 | Streijl .................... H04L 47/22 |

FOREIGN PATENT DOCUMENTS

| | | |
|---|---|---|
| EP | 3018863 A1 | 5/2016 |
| WO | WO2001020918 A2 | 3/2001 |
| WO | WO2019037846 A1 | 2/2019 |

\* cited by examiner

PASSIVE MEASUREMENT OF COMMUNICATION FLOWS

CROSS REFERENCE

The present Application for Patent is a 371 national phase filing of International Patent Application No. PCT/US2021/016485 by CHUNG et al. entitled, "PASSIVE MEASUREMENT OF COMMUNICATION FLOWS" filed Feb. 3, 2021, which claims the benefit of U.S. Provisional Patent Application No. 62/970,104 by CHUNG et al., entitled "PASSIVE MEASUREMENT OF COMMUNICATION FLOWS," filed Feb. 4, 2020, assigned to the assignee hereof, and expressly incorporated by reference in its entirety herein.

BACKGROUND

The following relates generally to communications and more specifically to passive measurement of communication flows.

A communications system may include one or more data networks and one or more access networks (e.g., a satellite network, cable network, digital subscriber line network, cellular network, etc.) that may be used by connected devices to access the one or more data networks. In some examples, a communications service provider (which may also be referred to as an operator) may operate at least a portion of an access network and may enter service agreements with one or more subscribers. As part of a service agreement, an operator may commit to consistently enable a subscriber to access a data network at an agreed-upon data rate (e.g., 15 Megabits per second (Mbps)). In some examples, to confirm that a subscriber is consistently able to access the data network via the access network at the agreed-upon data rate, an operator may perform speed tests associated with the subscriber that estimate a data rate available to the subscriber. In some examples, the data rate available to the subscriber may also be referred to as an achievable data rate for the subscriber.

SUMMARY

The described techniques relate to improved methods, systems, devices, and apparatuses that support passive measurement of communications flows. One or more flows between a node (e.g., a satellite network) and one or more other nodes (e.g., modems, user devices, etc.) in a communication network may be monitored over a time period. A flow may be a data link established between a node (e.g., a user device) and another node (e.g., a server) that enables data to flow over an established connection. During the monitoring, it may be identified that, during a subset of the time period, communications over at least one of the flows were restricted by the communication network—e.g., based on receiving at least one indicator of congestion for the at least one flow. A quantity of traffic communicated over the one or more flows during the subset of the time period may then be determined, and respective flow rates of the one or more flows may be obtained. The obtained flow rates may be used to calculate a data rate of one or more connections between the node and the one or more other nodes. In some examples, speed records for the one or more connections may be generated based on the calculated data rates.

DETAILED DESCRIPTION

Figure 1A:
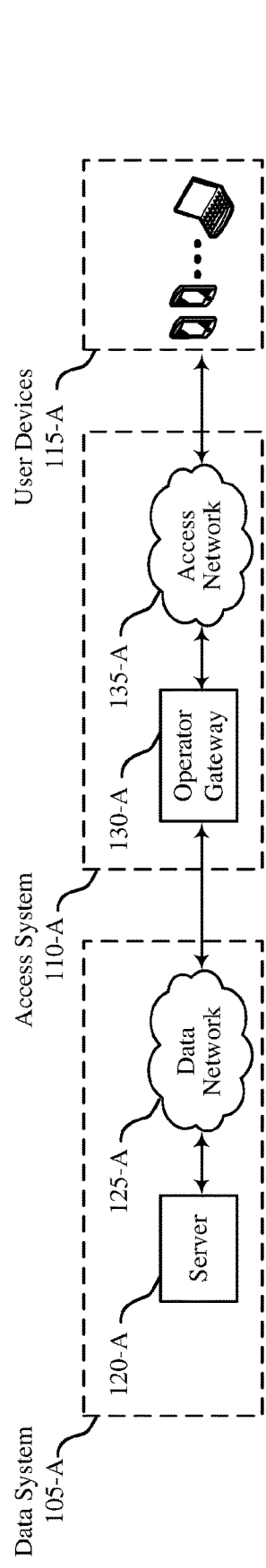
FIGS. 1A and 1B show communications systems that supports passive measurement of communication flows in accordance with examples as disclosed herein.

A communications service provider may provide varying levels of service to different user devices associated with subscriptions for accessing an access network used by the communications service provider. In some examples, a user device associated with a subscription may be provisioned by the communications service provider to communicate at a specified data rate (e.g., 5 Megabits per second (Mbps)) via the data network of the communications service provider. In some examples, a subscriber may request information from the communications service provider confirming that the access network is capable of consistently providing an agreed-upon data rate to the subscriber throughout a service period (e.g., a day). Accordingly, a communications service provider may generate records showing the data rate available to the subscriber throughout the service period.

To generate records showing the data rate available to a subscriber throughout a service period, a communications service provider may inject extra packets (e.g., packets including random or filler data used for speed testing) into an access network to measure an available data rate of a connection between a data network (e.g., the Internet) and a subscriber. That is, the communications service provider may perform a speed test for the connection between the data network and the subscriber. For large-scale systems, injecting these extra packets for each subscriber would excessively increase an amount of signaling overhead in the access network and reduce a throughput of the access network. Large-scale systems may communicate information to a large quantity of user devices across a large geographic area using multiple channels. In some examples, a channel may include one or more cells, one or more beams, one or more coverage areas, one or more carriers, or any combination thereof. A carrier may be associated with a frequency range in a portion of wireless spectrum. In some examples, a large-scale system may communicate with multiple user devices in one channel. Large-scale systems may also support a variety of service plans from which subscribers may select a service plan. Thus, for large-scale systems that support many subscribers, the extra packets may be transmitted over each channel and for each or a subset of the existing plans (e.g., two randomly selected plans) in accordance with a periodic interval (e.g., every 30 minutes).

To measure an available data rate for an increased quantity of subscribers with an increased frequency while reducing (or eliminating) a signaling overhead associated with performing a speed test, a technique for passively measuring an available data rate for the subscribers is described. In some examples, one or more flows between a node (e.g., a satellite network) and one or more other nodes (e.g., modems, user devices, etc.) in a communication network may be monitored over a time period. A flow may be a data link established between a node (e.g., a user device) and another node (e.g., a server) that enables data to flow over an established connection. During the monitoring, it may be identified that, during a subset of the time period, communications over at least one of the flows were restricted by the communication network—e.g., based on receiving at least one indicator of congestion for the at least one flow. A quantity of traffic communicated over the one or more flows during the subset of the time period may then be determined, and respective flow rates of the one or more flows may be obtained. The obtained flow rates may be used to calculate a data rate of one or more connections between the node and the one or more other nodes. In some examples, speed records for the one or more connections may be generated based on the calculated data rates.

FIG. 1A shows a communications system 100-*a* that supports passive measurement of communication flows in accordance with examples as disclosed herein. Communications system 100-*a* depicts components that are included in a system for communicating information (e.g., web data, text messaging, email messaging, video streaming, voice calling, etc.) between devices. Communications system 100-*a* may include data system 105-*a*, access system 110-*a*, and user devices 115-*a*. User devices 115 may also be referred to as nodes 115.

Data system 105-*a* may include data storage components (e.g., servers) that store data, connections between data storage components (e.g., wired links, wireless links, fiber-optic links, etc.), and routing components that route communications to intended recipients. Data system 105-*a* may include server 120-*a* and data network 125-*a*. Data network 125-*a* may include servers, connections, routers, transmission buffers, etc. In some examples, server 120-*a* is included within data network 125-*a*. In some examples, data network 125-*a* represents a portion of the Internet.

Access system 110-*a* may be owned and/or operated by an operator (e.g., a communications service provider). Access system 110-*a* may include operator gateway 130-*a* and access network 135-*a*. Operator gateway 130-*a* may act as an interface between data network 125-*a* and access network 135-*a*. In some examples, operator gateway 130-*a* includes components for terminating a transmission control protocol (TCP) connection between operator gateway 130-*a* and data network 125-*a* and establishing an intermediary TCP connection through access network 135-*a*.

Access network 135-*a* may include infrastructure that provides user devices a communicative path to data network 125-*a*. In some examples, access network 135-*a* includes a wireless communications infrastructure that is terrestrial-based— e.g., access network 135-*a* may include base stations, backhaul interfaces, a core network, and routers. In some examples, access network 135-*a* includes a wireless communications infrastructure that is non-terrestrial-based—e.g., access network 135-*a* may include gateways, satellites, a core network, and routers. In some examples, access network 135-*a* includes a wired communications infrastructure—e.g., access network 135-*a* may include electrical cables, fiber-optic cables, a core network, and routers. In some examples, access network 135-*a* may also include client-side modems that interface with access network 135-*a*. In some examples, the client-side modems may be located on a mobile vehicle (e.g., an aircraft, bus, watercraft, etc.). In some examples, access network 135-*a* may be, or include, one or more nodes.

User devices 115-*a* (also referenceable as subscribers) may include personal electronic devices, sensors, mobile vehicles, and the like. User devices 115-*a* may be associated with subscriptions that enable user devices 115-*a* to use access network 135-*a*. In some examples, a user device (e.g., a phone) may have a direct connection to access network 135-*a*—e.g., via a telecommunication link, satellite link, or wired link. In other examples, a user device (e.g., a laptop) may have an indirect connection to access network 135-*a* via a modem. In some examples, a modem may act as a gateway to access network 135-*a* for one or more user devices.

A communications service provider may own and/or operate access network 135-*a*. In some examples, the communications service provider provides communications services to user devices 115-*a* via access network 135-*a*. The communications service provider may provide varying levels of service to user devices 115-*a*. For example, the communications service provider may permit a first user device of user devices 115-*a* to use the access network to obtain 5 Mb of data per second (or 5 Mbps) from data network 125-*a* in accordance with a first plan, a second user device of user devices 115-*a* to use the access network to obtain 15 Mbps from the data network in accordance with a second plan, and a third user device of user devices 115-*a* to use the access network to obtain 100 Mbps from the data network in accordance with a third plan.

In some examples, the quantity of user devices that can be served by the communications provider is based on a capacity of access network 135-*a* (a maximum amount of data the access network can provide at one time) and the existing plans issued by the communications service provider. In some examples, the aggregate data rate promised to all of user devices 115-*a* exceeds a capacity of access network 135-*a*. The communications service provider may provision user devices 115-*a* with an aggregate data rate that exceeds a capacity of access network 135-*a* based on determining that user devices 115-*a* are likely to access the access network in a distributed and intermittent fashion. Accordingly, communications service provider may increase a utilization of access network 135-*a* and avoid periods of low (or no) usage. However, provisioning user devices 115-*a* with an aggregate data rate that exceeds a capacity of access network 135-*a* may result in communication delays, interruptions, or failures—e.g., during busy times. Communication delays, interruptions, or failures that occur when an excessive amount of data is transmitted over access network 135-*a* may be referred to as congestion limitations. In some examples, provisioning user devices 115-*a* with an aggregate data rate that exceeds a capacity of access network 135-*a* may be referred to as oversubscribing access network 135-*a*.

In some examples, a communication protocol (e.g., TCP) for communicating over data network 125-*a* (e.g., the Internet) and/or access network 135-*a* may be configured to identify and react to congestion events. In such cases, user devices 115-*a* may establish one or more connections to data network 125-*a* (e.g., via access network 135-*a*) and may communicate over the one or more connections in accordance with the communication protocol using one or more flows that manage and enable the exchange of data between the user devices 115-*a* and data network 125-*a* over the one or more connections. The communication protocol may be configured to ramp up an amount of data that may be in transit to a user device (e.g., an amount of data that may be transmitted and not acknowledged at any given time) via a flow. The size of the permitted amount of data (e.g., maximum bytes-in-flight) may be referred to as a congestion window. The congestion window may be managed according to an additive increase/multiplicative decrease (AIMD) algorithm. For example, the communication protocol may be configured to continue to increase the size of the congestion window (e.g., by an integer of a segment or packet size) until a transmitted data packet is lost (e.g., no acknowledgment (ACK) is received for the transmitted data packet within a designated interval or number of additional acknowledged packets) or a maximum size for the congestion window is reached. After detecting a lost packet, the communication protocol may be configured to assume the lost packet occurred due to congestion and decrease the size of the congestion window (e.g., to an initial size, by percentage such as half). After decreasing the size of the congestion window, the communication protocol may again increase the size of the congestion window until a data packet is lost or the maximum size is reached. By utilizing this communication protocol, a communications network may ensure that one user device will not monopolize the access network resources, preventing other user devices from fairly accessing data, during busy periods of operation.

In some examples, a subscriber (e.g., an owner of one or more of user devices 115-*a*, an owner of a device or vehicle that contracts for data services to one or more user devices owned by others, etc.) may request records from a communications service provider showing that an agreed-upon data rate is being provided to (or at least is available to) the subscriber. That is, if the communications service provider has agreed to provide a subscriber with a data rate of 100 Mbps, the subscriber may request that the communications service provider confirm that the subscriber is consistently able to obtain the agreed-upon data rate throughout a service period (e.g., on all days or times of the day). In some examples, if the communications service provider oversubscribes access network 135-*a*, the communications service provider may be unable to provide the agreed-upon data rates to the subscriber throughout a service period—e.g., the communications service provider may be limited to providing the subscriber with 50 Mbps during a busy period, which may violate a service agreement between the communications service provider and subscriber. The records requested by the subscriber may be used to confirm whether or not the communications service provider was capable of providing the agreed-upon data rate throughout the service period.

To generate records showing the data rate available to a subscriber throughout a service period, a communications service provider may inject extra packets (e.g., packets including random or filler data used for speed testing) into an access network to measure an available data rate of a connection between a data network and a subscriber. That is, the communications service provider may perform a speed test for the connection between the data network and the subscriber by initiating a flow used solely for the speed test. For large-scale systems, injecting these extra packets for each subscriber would excessively increase an amount of signaling overhead in the access network and reduce a throughput of the access network. Large-scale systems may communicate information to a large quantity of user devices across a large geographic area using multiple channels. In some examples, a large-scale system may communicate with multiple user devices in one channel. Large-scale systems may also support a variety of service plans from which subscribers may select a service plan.

Thus, for large-scale systems that support many subscribers, the extra packets may be transmitted over at least a subset of the channels, and for at least a subset of the existing plans (e.g., two randomly selected plans) in accordance with a periodic interval (e.g., every 30 minutes). For 12 Mbps plans, each speed test may use 15 MBs of data for the extra packets. For 25 Mbps plans, each speed test may use 31.25 MBs. For 50 Mbps plans, each speed test may use 62.5 MBs. For 100 Mbps plans, each speed test may use 125 MBs. Thus, for 12 Mbps plans, each speed test may use 21 GBs per month at an average rate of 66 kbps per hour. For 25 Mbps plans, each speed test may use 45 GBs per month at an average rate of 138 kbps per hour. For 50 Mbps plans, each speed test may use 90 GBs per month at an average rate of 276 kbps per hour. And for 100 Mbps plans, each speed test may use 180 GBs per month at an average rate of 555 kbps per hour.

To measure an available data rate for an increased quantity of subscribers with an increased frequency while reducing (or eliminating) a signaling overhead associated with performing a speed test, a technique for passively measuring an available data rate for the subscribers is described. In some examples, one or more flows between a node (e.g., a satellite network) and one or more other nodes (e.g., modems, user devices, etc.) in a communication network may be monitored over a time period. A flow may be a data link established between a node (e.g., a user device) and another node (e.g., a server, a packet gateway) that enables data to flow over an established connection. During the monitoring, it may be identified that, during a subset of the time period, communications over at least one of the flows were restricted by the communication network—e.g., based on receiving at least one indicator of congestion for the at least one flow. A quantity of traffic communicated over the one or more flows during the subset of the time period may then be determined, and respective flow rates of the one or more flows may be obtained. The obtained flow rates may be used to calculate a data rate of one or more connections between the node and the one or more other nodes. In some examples, speed records for the one or more connections may be generated based on the calculated data rates.

Figure 1B:
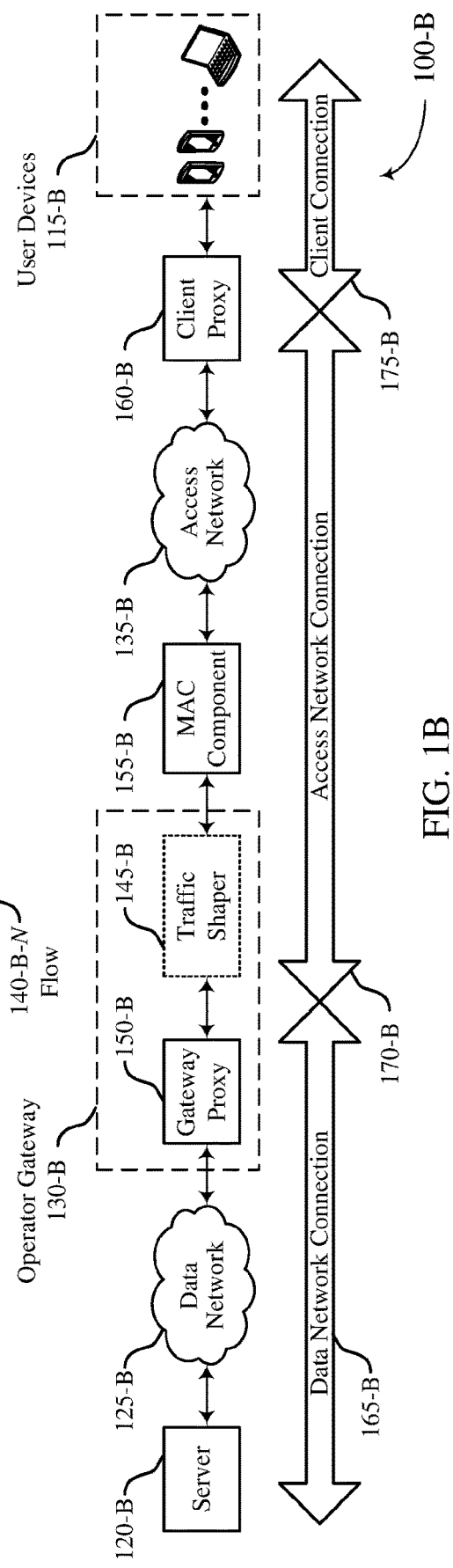

FIG. 1B shows a communications system that supports passive measurement of communication flows in accordance with examples as disclosed herein. Communications system 100-*b* may be an example of communications system 100-*a*. Communications system 100-*b* may include server 120-*b* and data network 125-*b*, which may be examples of server 120-*a* and data network 125-*a*, as described with reference to FIG. 1A. In some examples, server 120-*b* and data network 125-*b* may be included in a data system.

Communications system 100-*b* may include operator gateway 130-*b* and access network 135-*b*, which may be examples of operator gateway 130-*a* and access network 135-*a*, as described with reference to FIG. 1A. In some examples, the operator gateway includes traffic shaper 145-*b* and gateway proxy 150-*b*. In some examples, traffic shaper 145-*b* may be positioned after gateway proxy 150-*b* in the data path (as shown in FIG. 1B). In some examples, traffic shaper 145-*b* may be positioned before gateway proxy 150-*b* in the data path. In some examples, another traffic shaper may be positioned before gateway proxy 150-*b* in the data path, and traffic shaper 145-*b* may be positioned after gateway proxy 150-*b* in the data path.

Gateway proxy 150-*b* may be configured to manage the communication of information to user devices 115-*b* via access network 135-*b*. In some examples, operator gateway 130-*b* and access network 135-*b* may be included in an access system. Medium access control (MAC) component 155-*b* may also be included in the access system. In some examples, MAC component 155-*b* may be included within either operator gateway 130-*b* or access network 135-*b*. Also, client proxy 160-*b* may be included in the access system. In some examples, client proxy 160-*b* may be a modem.

Communications system 100-*b* may also include user devices 115-*b*, which may be examples of user devices 115-*a*, as described with reference to FIG. 1A. User devices 115-*b* may communicate with server 120-*b* via data network 125-*b* and access network 135-*b* using one or more of the techniques described herein and with reference to FIG. 1A.

In some examples, a user device of user devices 115-*b* establishes a connection with one or more servers in data network 125-*b*, such as server 120-*b*. The user device may establish the connection and communicate with server 120-*b* in accordance with a communication protocol (e.g., TCP or UDP). In some examples, first flow 140-*b*-1 may represent a first data link between the user device and server 120-*b* that is used to communicate data over a connection between the user device and server 120-*b*. The user device may establish additional flows with server 120-*b* and/or other servers in data network 125-*b*, including Nth flow 140-*b*-N. In some examples, Nth flow 140-*b*-N may represent a data link between another user device of user devices 115-*b* and a server in data network 125-*b*. In some examples, flows 140-*b* may extend from a user device to gateway proxy 150-*b*, while additional flows may be established between gateway proxy 150-*b* and a server in data network 125-*b*. In some cases, and end-to-end flow may also be established between the user device and the server in data network 125-*b*. That is, flows 140-*b* may be within other flows such as end-to-end flows.

In some examples, a connection between a user device of user devices 115-*b* and data network 125-*b* is broken into multiple connections: data network connection 165-*b*, access network connection 170-*b*, and client connection 175-*b*. Gateway proxy 150-*b* may be configured as a relay point between data network connection 165-*b* and access network connection 170-*b*, and may establish flows for communication via access network 135-*b*. In some examples, gateway proxy 150-*b* may determine a congestion window for the flows—e.g., based on an indication of the congestion window included in a data network portion of the flows. Similarly, client proxy 160-*b* may be configured as a relay point between access network connection 170-*b* and client connection 175-*b*. Client proxy 160-*b* may referred to as a mobile terminal, a mobile multi-user terminal, or a modem.

In some cases, achievable data rates may be determined using extra packets (e.g., random or filler packets), which may be used to measure the data rate over access network to client proxy 160-*b*, but not to individual user devices 115-*b* (e.g., because user devices 115-*b* may not have an application associated with receiving the extra packets). Thus, speed tests using active measurements (e.g., by injecting extra packets) may only be able to measure the data rate between gateway proxy 150-*b* and client proxy 160-*b*, but not to individual user devices 115-*b*. That is, because the access network may be unable to send the extra packets directly to a user device, the access network may send the extra packets to a dummy device also connected to the client proxy 160-*b* to estimate an achievable data rate for the user device. Although this may provide an approximation of the achievable data rate for the user device, speed tests using dummy devices do not directly measure actual achievable data rates for the user devices.

As described herein, a congestion window associated with one or more flows (e.g., first flow 140-*b*-1 or first flow 140-*b*-1 through Nth flow 140-*b*-N) established for a user device, as well as traffic over the one or more flows, may be monitored to determine an achievable data rate of a connection between a user device and an access network—e.g., instead of injecting extra speed-measurement packets into the access network traffic.

In some examples, gateway proxy 150-*b* monitors a congestion window for first flow 140-*b*-1. Gateway proxy 150-*b* may identify that the communication of information over first flow 140-*b*-1 has been restricted by a capacity of the communication network based on monitoring the congestion window. Accordingly, gateway proxy 150-*b* may identify a set of time periods (e.g., overlapping time periods) associated with the restricted capacity (or congestion) event in a measurement window. In some examples, the time periods each extend for a duration (e.g., 1 sec, 2 sec, 5 sec, 10 sec). When the time periods are overlapping, a beginning of each time period may be separated by a duration that is smaller than a duration of the time periods—e.g., if the time periods are each 5 seconds, the duration may be equal to 1 second. Gateway proxy 150-*b* may determine an intermediary flow rates for first flow 140-*b*-1 during each time period of the identified set of time periods—e.g., by dividing an amount of data communicated during a time period by the duration of the time period.

After determining the intermediary flow rates of first flow 140-*b*-1 for each time period, gateway proxy 150-*b* may calculate a flow rate of the flow based on the determined intermediary flow rates. In some examples, gateway proxy 150-*b* calculates that the flow rate of first flow 140-*b*-1 during a time interval is equivalent to the highest intermediary flow rate of first flow 140-*b*-1 measured during the measurement window. In some examples, gateway proxy 150-*b* calculates that the flow rate of first flow 140-*b*-1 during a time interval is equivalent to an average, mean, or median of the intermediary flow rates of first flow 140-*b*-1 measured during the measurement window. In some examples, gateway proxy 150-*b* calculates additional flow rates for other flows associated with first flow 140-*b*-1—e.g., other flows that terminate at a same device as first flow 140-*b*-1, or other flows that pass through a common node for which determining a composite data rate is desired.

After calculating the flow rate of first flow 140-*b*-1 (and any associated flows), gateway proxy 150-*b* may calculate a data rate of a connection between multiple nodes in a communication network. After calculating the data rate of the connection, gateway proxy 150-*b* may generate a speed record for the connection. In some examples, gateway proxy 150-*b* may generate a speed record for the connection each time a congestion event is identified for a flow associated with the connection. In some examples, gateway proxy 150-*b* performs similar operations to generate speed records for other connections associated with one or more active flows up to and including Nth flow 140-*b*-N.

In some examples, gateway proxy 150-*b* determines that multiple flows are established for one user device and estimates an achievable data rate of a connection between the user device and access network 135-*b* based on combining (e.g., adding) flow rates determined for the multiple flows. In some examples, gateway proxy 150-*b* determines that multiple flows are established for one modem (e.g., client proxy 160-*b*) and estimates an achievable data rate of a connection between the modem and access network 135-*b* based on combining (e.g., adding) flow rates determined for the multiple flows. That is, each record, which may be triggered based on an indication that any of the multiple flows is restricted by a capacity of the communication network, may include flow rates for the multiple flows. In some examples, client proxy 160-*b* may perform the same, similar, or complementary functions with relation to flows where traffic is communicated from client proxy 160-*b* to gateway proxy 150-*b*.

In some examples, gateway proxy 150-*b* identifies a set of connections that are associated with a service plan (e.g., a 15 Mbps plan) provided by a communications service provider that operates access network 135-*b*. Gateway proxy 150-*b* may estimate a combined achievable data rate (e.g., an aggregate, average, median, or mean achievable data rate) of connections associated with the service plan based on flow rates determined for the identified set of connections. In some examples, gateway proxy 150-*b* identifies a set of connections that are associated with a channel supported by access network 135-*b*, where a channel may be associated with a carrier, cell, or beam used by access network 135-*b* to communicate with multiple of user devices 115-*b*. For example, gateway proxy 150-*b* may estimate a combined achievable data rate (e.g., an aggregate, average, median, or mean achievable data rate) of connections associated with the channel based on flow rates determined for flows associated with the identified set of connections.

In some examples, gateway proxy 150-*b* identifies a set of connections that are associated with a service plan (e.g., a 15 Mbps plan) provided by the communications service provider. Gateway proxy 150-*b* may estimate a combined achievable data rate (e.g., an aggregate, average, median, or mean achievable data rate) of connections associated with the service plan based on flow rates determined for flows associated with the identified set of connections. Additionally, or alternatively, gateway proxy 150-*b* may identify a set of connections that are associated with a channel. In some examples, gateway proxy 150-*b* may estimate a combined achievable data rate (e.g., an aggregate, average, median, or mean achievable data rate) of connections associated with a particular channel based on flow rates determined for flows associated with the identified set of connections. In some examples, gateway proxy 150-*b* may estimate a combined achievable data rate for a set of user devices in a channel that use a same service plan based on data rates determined for the identified set of connections. In some examples, each record for the connections, which may be triggered based on an indication that any of multiple flows over the connections is restricted by a capacity of the communication network, may include flow rates for the multiple flows associated with the connections.

In some examples, gateway proxy 150-*b* switches between the passive speed-measurement technique and an active speed-measurement technique that involves communicating extra packets (e.g., packets including random or filler data) over access network 135-*b* solely to obtain a speed measurement. For example, gateway proxy 150-*b* may use active speed-measurement techniques during periods when access network 135-*b* is not (or is not expected to be) congested and may use passive speed-measurement techniques when access network 135-*b* is (or is expected to be) congested. In some examples, MAC component 155-*b* may perform the same, similar, or complementary functions with relation to gateway proxy 150-*b*.

Figure 2:
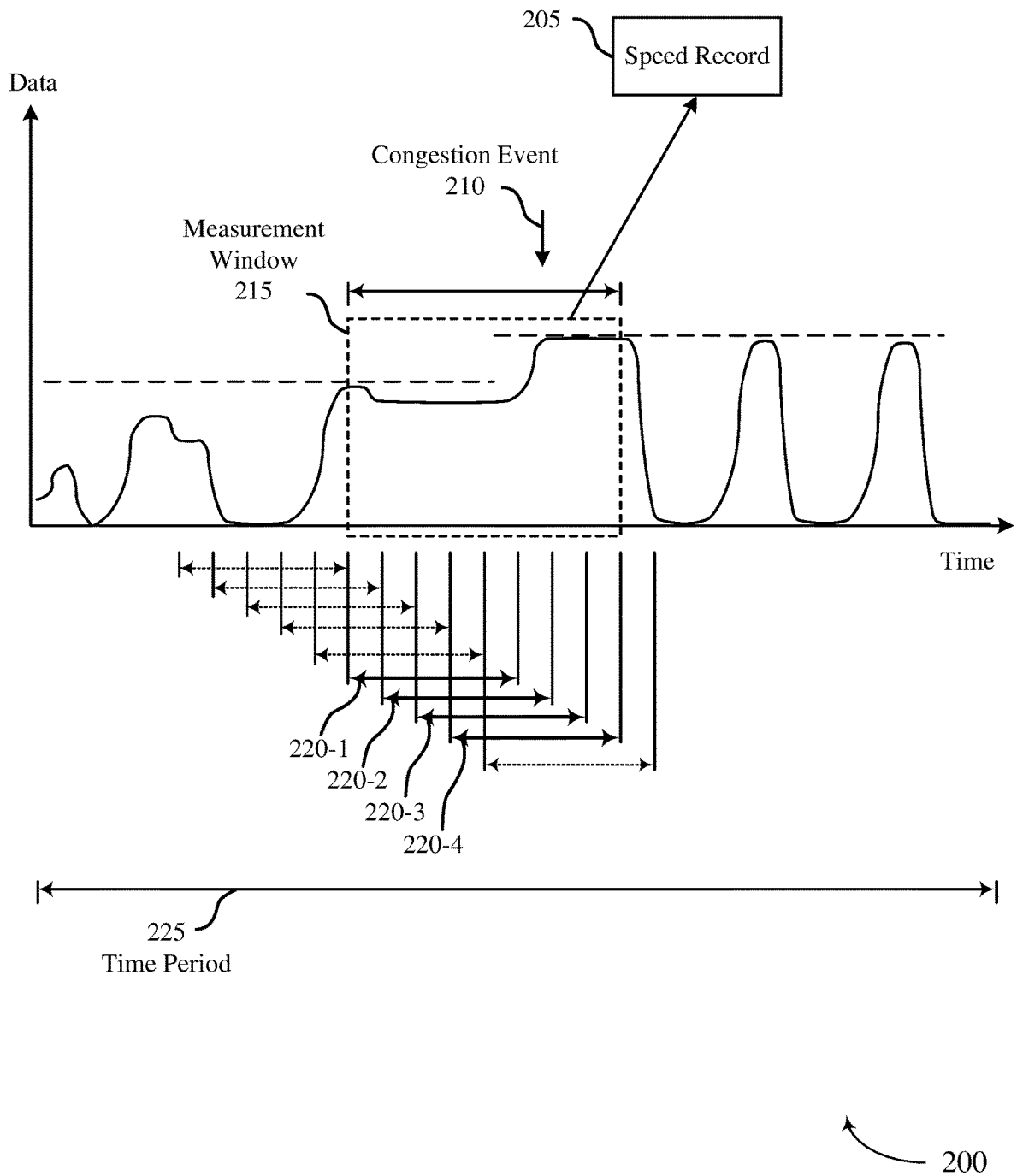
FIG. 2 shows a diagram for passive measurement of communication flows in accordance with examples as disclosed herein.

FIG. 2 shows a diagram for passive measurement of communication flows in accordance with examples as disclosed herein. Diagram 200 depicts traffic communicated using a flow over a time period. Diagram 200 may depict an instantaneous amount of data being communicated using the flow on a first axis against time on a second axis. In some examples, the second axis may be partitioned into multiple time slots (e.g., overlapping time slots). In some examples, the resulting plot of the amount of data versus time may result in a traffic profile that documents the traffic communicated using the flow over time period 225 (e.g., over the duration that the flow is established).

As described herein, an indication of congestion in a communication network may be obtained from the communication network—e.g., by a component monitoring a flow (e.g., a gateway proxy or client proxy). In some examples, the indication is obtained based on monitoring flows over the communication network and identifying congestion events. In some examples, a congestion window associated with a flow may be monitored to determine whether a congestion event has occurred. In some examples, a congestion event is identified based on a quantity of data being communicated over a flow (but not yet acknowledged by a user device) exceeding a threshold. Such data may be referred to as "outstanding data," as being "in transit data," or as "bytes-in-flight," and may be monitored relative to a congestion window that is used as a limit on the amount of data in transit at a given time. For example, a congestion event may be identified if a quantity of data in transit exceeds a portion (e.g., a half, two-thirds, etc.) of a congestion window size.

In some examples, a congestion event is identified based on identifying that a transmission buffer for the flow (e.g., a TCP transmission queue) has included a quantity of data that has not yet been transmitted over the flow for a threshold duration, or has a certain amount of packets or data relative to the congestion window size. For example, transmission buffer may use first-in-first-out queueing and the quantity of data may increase when additional packets are received for transmission and may decrease when packets are transmitted. That is, the quantity of data may represent data from different packets at different points in time. In some examples, the congestion event is identified based on determining that the quantity of data has exceeded a threshold quantity of data that is greater than zero for the threshold duration. In other examples, a congestion event is determined based on identifying a reduction in the congestion window for the flow. In another example, a congestion event may be identified based on a quantity of data in transit (e.g., bytes-in-flight) in relation to a congestion window size.

In some examples, a passive measurement component (e.g., a gateway proxy or client proxy) monitoring the flow may identify congestion event 210. After identifying congestion event 210, the passive measurement component may identify measurement window 215. Measurement window 215 may represent a subset of time period 225 over which the measurement component monitors the flow. In some examples, one or more time slots 220 (e.g., overlapping time slots) associated with congestion event 210 occur during measurement window 215. In some examples, a beginning of measurement window 215 occurs before congestion event 210. A beginning of measurement window 215 may also occur concurrently with congestion event 210, or after congestion event 210. In some examples, the identified one or more overlapping time slots may include first time slot

220-1, second time slot 220-2, third time slot 220-3, and fourth time slot 220-4. In some examples, each time slot 220 may extend for a duration (e.g., five (5) s, ten (10) s, etc.). Also, a beginning of each time slot 220 may be separated from another time slot 220 by a second, smaller duration (e.g., one (1) s, two (2) s, etc.). By using overlapping time slots, more measurements may be taken within a measurement window 215, and the likelihood of an entire time slot falling within measurement window 215 may be increased (e.g., a condition being satisfied for at least one time slot 220).

After identifying the time slots associated with congestion event, the passive measurement component may estimate an intermediary flow rate for each of the time slots—that is, the passive measurement component may estimate a first intermediary flow rate associated with first time slot 220-1, a second intermediary flow rate associated with second time slot 220-2, and so on. In some examples, the passive measurement component estimates the first intermediary flow rate by dividing an amount of data transmitted during a time slot 220 (e.g., first time slot 220-1) by a duration of the time slot 220 (e.g., a duration of first time slot 220-1).

After estimating the intermediary flow rates for each of time slots 220, the passive measurement component may use the intermediary flow rates to determine a flow rate for the flow during measurement window 215. In some examples, the flow rate may be determined based on the highest determined intermediary flow rate. In some examples, the flow rate may be determined based on an average, mean, or median of the intermediary flow rates.

In some examples, the determined flow rate may be used to determine a data rate for a connection between a first node and a second node in a communication network. Also, the determined data rate may be used to generate speed record 205 for the connection. In some examples, after detecting congestion event 210 for the flow, the passive measurement component may also determine flow rates for one or more other flows that are associated with a same node (e.g., a modem, a user device, an Internet Protocol (IP) address), same service plan (e.g., a residential plan), or channel as the flow. In some examples, the determined data rate may be based on the flow rates determined for each flow associated with a same node, service plan, or channel.

The passive measurement component may generate a speed record (e.g., speed record 205) based on the data rate determined for the connection. In some examples, the speed record is generated based on a data rate determined based on combining (adding, averaging, etc.) the flow rates for each flow associated with a same node, service plan, or channel. In some examples, the passive measurement component may generate the speed record based on the data rates determined for the connection and for connections associated with a same node, service plan, or channel as the connection. In some examples, multiple speed records (including speed record 205) may be generated for a connection (and the associated connection)—e.g., based on identifying multiple congestion events. In some examples, post-processing may be used to discard a subset of the speed records (e.g., artificially low speed records). Speed records may be similarly generated for other sets of flows (e.g., with similar or different traffic profiles) associated with a communication network.

Although overlapping time slots are depicted in FIG. 2, in some examples, the time slots are non-overlapping. In some examples, the time slots may have shorter durations than the overlapping time slots—e.g., each time slot may extend one (1) second and beginnings of each time slot may be separated from one another by one (1) second. Intermediary flow rates may similarly be determined for each non-overlapping time slot and used to determine a flow rate.

Figure 3:
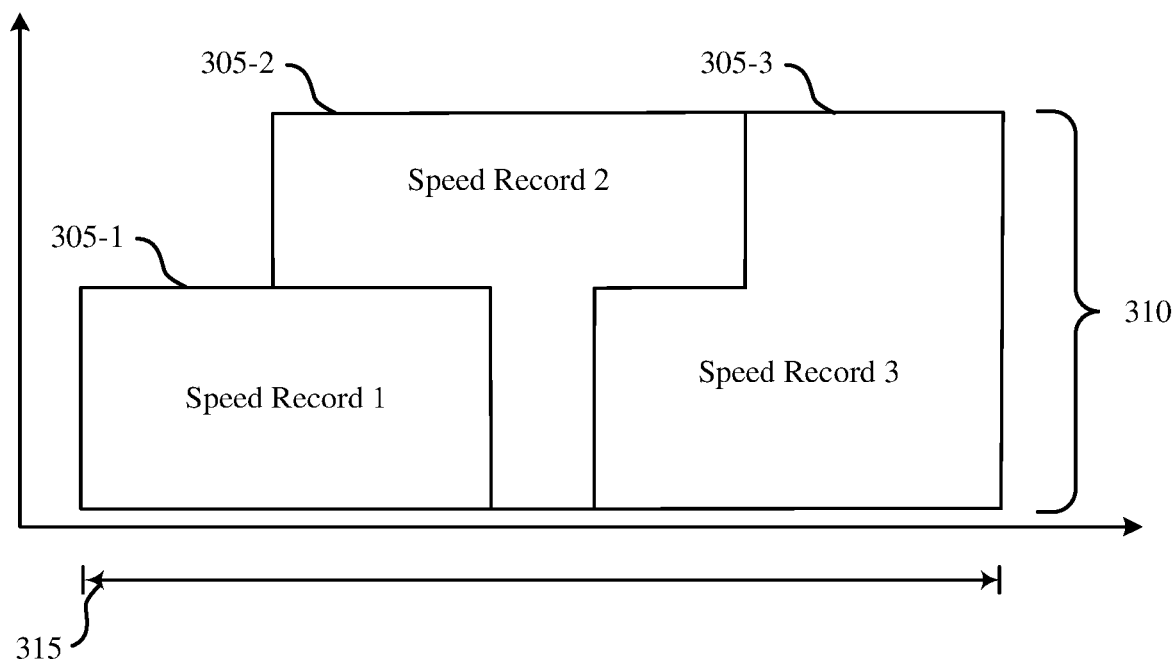
FIG. 3 shows a diagram for passive measurement of communication flows in accordance with examples as disclosed herein.

FIG. 3 shows a diagram for passive measurement of communication flows in accordance with examples as disclosed herein. Diagram 300 depicts multiple speed records that may be generated for one or more flows within a time period, as similarly described herein and with reference to FIG. 2. In some examples, a speed record may be generated when a qualified burst occurs. A qualified burst may occur when a stream of packets is transmitted for a threshold duration (e.g., five (5) seconds) without an associated transmission buffer (e.g., a TCP transmission buffer) being empty. A qualified burst may occur when a congestion window decreases. A qualified burst may occur when a quantity of data in transit exceeds a threshold (e.g., is greater than half of a congestion window size). In some examples, a qualified burst occurs based on a combination of the preceding scenarios occurring.

In some examples, a speed record contains a start time, an end time, a base station identifier, a modem identifier, a source IP address, a destination IP address, a source port, a destination port, a differentiated services code point. The speed record may also include an indication of a start of the last N seconds of a last measurement window (which may be referred to as Tx Last N-Sec of Last Qualified Burst Start Time) and an indication of an end of the last N seconds of the last measurement window (which may be referred to as Tx Last N-Sec of Last Qualified Burst End Time). In some examples, the indication of the end of the last N seconds of the last measurement window is excluded if the speed record includes an end time of the last measurement window (which may be referred to as Tx Last Qualified Burst End Time).

The speed record may also include an indication of the quantity of bytes transmitted during the last N seconds of the measurement window (which may be referred to as Tx Las N-Sec of Last Qualified Burst Tx Bytes). Also, the speed record may include an indication of the quantity of congestions events that cause a congestion window reduction during the last N seconds of the measurement window (which may be referred to as Tx Last N-Sec of Last Qualified Burst Congestion Events).

The speed record may also include an indication of the quantity of bytes transmitted to one terminal (e.g., a modem) during the last N seconds of a measurement window (which may be referred to as Tx Last N-Sec of Last Qualified Burst Other TCP Bytes for Same Terminal). As well as an indication of the quantity of bytes transmitted to one IP address (e.g., to a user device) during the last N seconds of a measurement window (which may be referred to as Tx Last N-Sec of Last Qualified Burst Other TCP Bytes for Same Dest IP). In some examples, the indication of the quantity of bytes transmitted to an IP address is determined based on aggregating a quantity of bytes transmitted over a flow for which a congestion event is identified with a quantity of bytes transmitted over additional flows that terminate at the same IP address as the flow.

The speed record may also include an indication of the quantity of bursts that occur in a time window (which may be referred to as Tx Qualified Burst Count), the start time of a last measurement window (which may be referred to as Tx Last Qualified Burst Start Time), the end time of a last measurement window (which may be referred to as Tx Last Qualified Burst End Time), and the quantity of bytes transmitted in the last measurement window (which may be referred to as Tx Last Qualified Burst Tx Bytes). Also, the speed record may include an indication of the quantity of congestion events that occur during a last measurement window (which may be referred to as Tx Last Qualified Burst Congestion Events) and an indication of a smoothed round trip time (SRTT) associated with the last measurement window (which may be referred to as Tx Last Qualified Burst SRTT).

In some examples, the speed record may also include an indication of a maximum achievable data rate associated with the time window (which may be referred to as Tx Est Max Data Rate). The speed record may also include an indication of a maximum achievable data rate estimate during a last measurement window (which may be referred to as Tx Est Max Data Rate).

In some examples, speed records are published after an end of a qualified burst. In other examples, speed records are published after a connection associated with the speed records is closed. Additionally, or alternatively, speed records (if available) may be published periodically (e.g., every 5 minutes). In some examples, if no speed records were generated by the time the connection is closed, a speed record indicating there were no congestion events may be published or no speed record may be published. In some examples, after publishing the speed records, the speed records may be processed to generate additional information such as a business ID or service type e.g., to identify mobility and residential business plans, such as commercial airline plans or residential service plan types.

As described herein, speed records may be generated for connections associated with one or more client devices (e.g., a user device, a user terminal (e.g., which may be fixed or mobile), or a customer premise equipment (CPE)), service plans, or channels. In some examples, a single speed record may be generated for multiple flows associated with a connection for a single client device, where the speed record may include the quantity of bytes transmitted for all of the flows owned by the client device during a time period. In some examples, the single speed record may include an indication of the quantity of bytes transmitted over each flow owned by a terminal (which may be referred to as Tx Last N-Sec of Last Qualified Burst Other TCP Bytes for Same Terminal). Additionally, or alternatively, the single speed record may include an indication of the quantity of bytes transmitted over each flow associated with an IP address (which may be referred to as Tx Last N-Sec of Last Qualified Burst Other TCP Bytes for Same Dest IP). Thus, a single speed record may be used to determine an achievable data rate for the client device during a first time period. In some examples, a single speed record may similarly be generated for multiple flows associated with a service plan, channel, or any combination thereof.

In some examples, multiple speed records generated for one or more connections may be combined to determine an achievable data rate for a client device, service plan, or channel over time period 315, which may be longer than the first time period. For example, first speed record 305-1, second speed record 305-2, and third speed record 305-3 may be generated for a connection of a client device during time period 315. The speed records 305 may be combined with one another to determine an achievable data rate for the client device over time period 315. In another example, first speed record 305-1, second speed record 305-2, and third speed record 305-3 may be generated for multiple connections of multiple client devices during time period 315, where the multiple client devices may be associated with a same modem, service plan, channel, or any combination thereof. In some examples, the speed records 305 may be combined with one another to determine an achievable data rate for the modem, service plan, channel, or any combination thereof over time period 315.

In some examples, separate speed records may be generated for multiple flows associated with one or more client devices (e.g., a user device, a mobile terminal, or a customer premise equipment (CPE)), service plans, or channels. In some examples, the separate speed records may be combined to determine an achievable data rate for a client device, service plan, modem, channel, or any combination thereof. For example, first speed record 305-1 may be generated for a first flow associated with the client device, second speed record 305-2 may be generated for a second flow associated with the client device, and third speed record 305-3 may be generated for a third flow associated with the client device during time period 315. In some examples, the speed records 305 may be combined with one another to determine an achievable data rate for the client device over time period 315. In another example, first speed record 305-1 may be generated for a first flow associated with a first service plan, modem, channel or any combination thereof, second speed record 305-2 may be generated for a second flow associated with the first service plan, modem, channel or any combination thereof, and third speed record 305-3 may be generated for a third flow associated with the first service plan, modem, channel or any combination thereof during time period 315. In some examples, the speed records 305 may be combined with one another to determine an achievable or composite data rate for a first service plan, modem, channel, or any combination thereof over time period 315.

The achievable data rate for the client device or service plan may be represented by capacity 310. In some examples, a data rate associated with a single speed record or a combination of speed records may span the available capacity 310.

Speed samples may be generated using the speed records to obtain speed samples for a client device. In some examples, a speed sample is calculated for a client device (e.g., a user device) from a speed record based on the following formula:

$$\text{Speed} = \frac{TxBytes_1 + TxBytes_2}{TxEnd - TxStart},$$

where:

TxBytes$_1$=TxLastNSecofLastQualifiedBurstTxBytes,

TxBytes$_2$=TxLastNSecofLastQualifiedBurstOtherTCPBytesforSameTerminal,

TxEnd=TxLastNSecofLastQualifiedBurstEndTime,

TxStart=TxLastNSecofLastQualifiedBurstStartTime.

A terminal speed sample may also include a business ID, a modem ID, an IP address of the client device, a base station ID, a differential services code point, a start time, and an end time.

In some examples, a speed sample is calculated for a client device (e.g., a CPE) from a speed record based on the following formula:

$$\text{Speed} = \frac{TxBytes_1 + TxBytes_2}{TxEnd - TxStart},$$

where:

TxBytes$_1$=TxLastNSecofLastQualifiedBurstTxBytes,

TxBytes$_2$=TxLastNSecofLastQualifiedBurstOther-TCPBytesforSameDestIP,

TxEnd=TxLastNSecofLastQualifiedBurstEndTime,

TxStart=TxLastNSecofLastQualifiedBurstStartTime.

A CPE speed sample may also include a business ID, a modem ID, an IP address of the client device, a base station ID, a differential services code point, a start time, and an end time.

In some examples, a speed sample is calculated for a service plan (e.g., a residential service plan) from multiple speed records associated with multiple client devices that occur within a time period designated by $T_{End}$-$T_{start}$ based on the following formula:

$$\text{Speed} = \frac{\sum TxBytes(TCPSpeedRecord_i)}{T_{End} - T_{Start}},$$

where:

TxBytes=TxLastNSecofLastQualifiedBurstTxBytes.

In some examples, the multiple speed records correspond to speed records 305 and the time period corresponds to time period 315. A duration of time period 315 may extend for a predetermined duration (e.g., five (5) minutes, fifteen (15) minutes, etc.). In some examples, multiple speed records may be generated using speed records 305—e.g., a speed record may be for each available combination of Modem ID, DSCP, and base station identifier (BSID).

In some examples, the generated speed samples may be compared against an active speed test result. In some cases, if the error margin between the sample exceeds a threshold (e.g., 10%), then the top P % (e.g., where P may equal 90) of speed samples calculated for the residential terminals may be kept—e.g., to reduce the effect of artificially low speed samples. A residential speed sample may also include a business ID, a modem ID, a terminal IP address, a base station ID, a differential services code point, a start time, and an end time.

In some examples, a speed sample is calculated for a mobile terminal (e.g., a modem) from multiple speed records associated with multiple client devices served by the multi-user terminal. The speed sample may be calculated using a formula similar to the formula used to calculate a speed sample for a service plan. In some examples, speed samples for client devices (e.g., a user device or CPE) behind a modem may be calculated using a formula similar to the formulas used to calculate speed samples for a user device or CPE.

The speed samples may be used to generate additional reports, such as a mobility TCP speed availability for an aircraft and/or aircraft operator, a residential plan speed availability by channel, a mobility personal electronic device plan speed availability by aircraft and/or aircraft operator, a speed experience of each residential subscriber, a mobility personal electronic device (PED) speed experience of each passenger on an aircraft, and the like.

Figure 4:
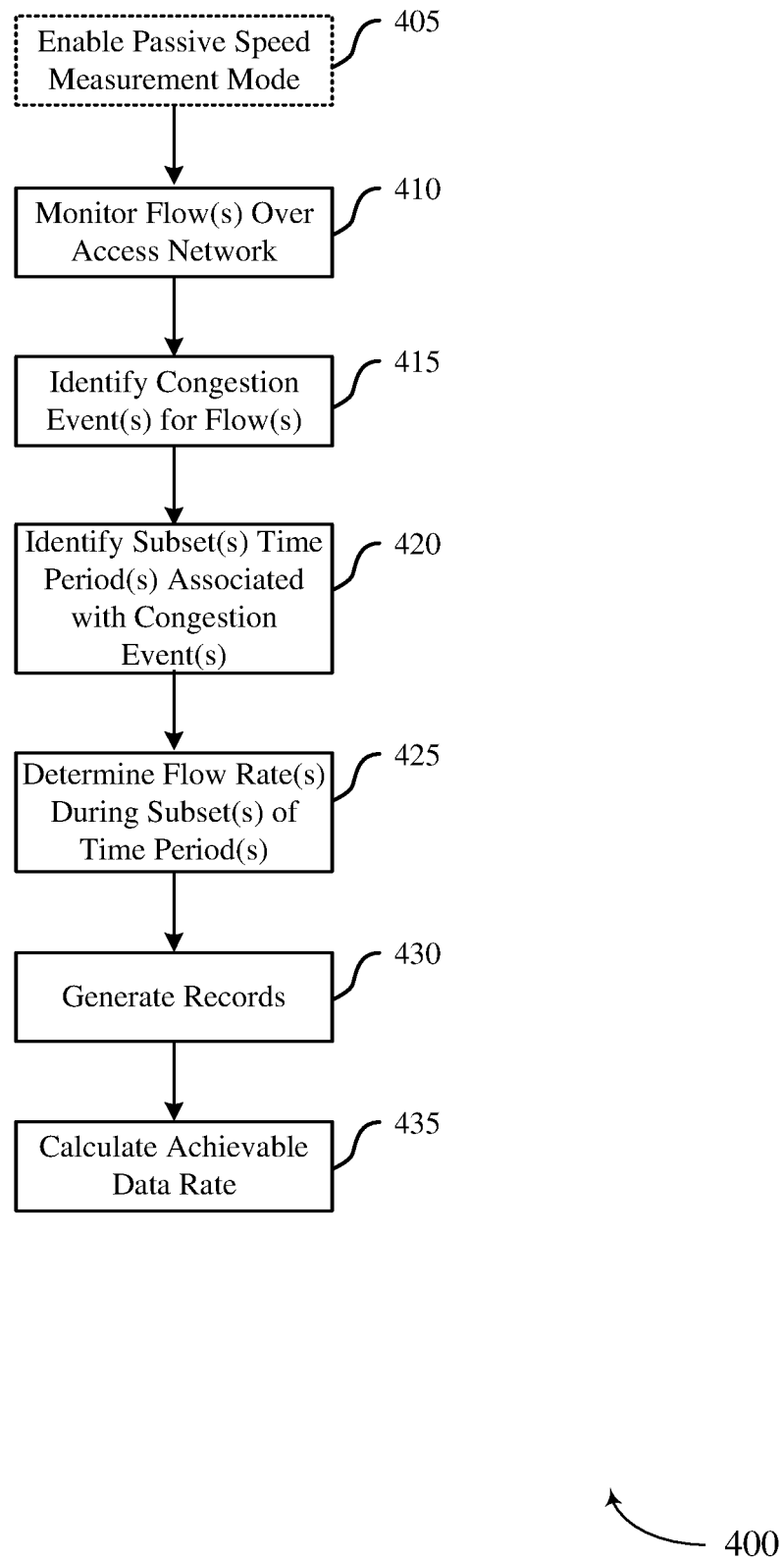
FIG. 4 shows an exemplary sequence of operations performed to support passive measurement of communication flows in accordance with examples as disclosed herein.

FIG. 4 shows an exemplary sequence of operations performed to support passive measurement of communication flows in accordance with examples as disclosed herein. Flowchart 400 depicts operations for passively estimating an achievable data rate of a connection used to serve a user device, an achievable data rate of an access network allocated to a service plan, an achievable data rate of a channel supported by a network, or any combination thereof.

It is understood that one or more of the operations described in flowchart 400 may be performed earlier or later in the process, omitted, replaced, supplemented, or performed in combination with another operation. Also, additional operations described herein that are not included in flowchart 400 may be included.

At block 405, a mode for passively measuring flows (also referenceable as a passive measurement mode) over an access network may be enabled (e e.g., by a gateway proxy or a client proxy). In some examples, before the passive measurement mode is enabled, a mode for actively measuring flows (also referenceable as an active measurement mode) by injecting extra packets into the access network may be enabled. In some examples, the passive measurement mode is enabled during time periods associated with high usage of the access network. That is, the passive measurement mode may be enabled during historically busy periods (e.g., around 4 PM)— periods where an amount of data provided by the network exceeds a threshold. In some examples, the passive measurement mode may be enabled on a geographic basis (e.g., the passive measurement mode may be enabled for a subset of beams associated with busy periods and the active measurement mode may be enabled for a subset of beams associated with normal or low-usage periods).

At block 410, flows over the access network may be monitored (e.g., by a gateway proxy or a client proxy) for an indication of congestion associated with the access network (e.g., a congestion event). In some examples, one or more of the flows may be associated with one user device. In some examples, one or more of the flows may be associated with a multi-user device (e.g., a client modem) that provides data services to other user devices. In some examples, a subset of the flows may be associated with a channel supported by the access network and used to provide communications services to a first set of user devices. In some examples, a subset of the flows may be associated with a type of service plan (e.g., a residential service plan). In some examples, a subset of the flows may be associated with a channel and a portion of the subset of the flows may be associated with a type of service plan. In some examples, a gateway proxy may monitor congestion metrics for each of the flows (e.g., a congestion window, a quantity of packets in transit, etc.).

At block 415, one or more congestion events may be identified for one or more of the flows over the access network (e.g., by a gateway proxy or a client proxy). In some examples, a congestion event is identified for a flow when a quantity of packets in transit for the flow exceeds a threshold associated with a congestion window size for the flow—e.g., if the quantity of packets exceeds a half, two-thirds, or nine-tenths of the congestion window size. In some examples, a congestion event is identified when a transmission buffer for the flow includes a threshold quantity of unsent data for a threshold duration. In some examples, a congestion event is identified after a reduction in a congestion window size for a flow is detected.

At block 420, one or more subsets of a time period may be determined for the one or more flows for which congestion events are identified (e.g., by a gateway proxy or a client proxy). In some examples, the one or more subsets of the time period may be associated with the congestion event— e.g., may occur a predetermined duration before, concurrently with, or a predetermined duration after the congestion event. A duration from a start of the one or more subsets of the time period to the end of the one or more subsets of the time periods may be associated with a measurement window associated with the congestion event. In some examples, the one or more subsets of the time period may be partitioned into one or more time slots. In some examples, the time slots may be overlapping. In other examples, the time slots may be non-overlapping.

At block 425, flow rates for the one or more flows associated with the congestion events may be determined (e.g., by a gateway proxy or a client proxy). In some examples, for each flow, intermediary flow rates of traffic communicated using the flow (e.g., forward link or reverse link traffic) may be determined for each time slot identified for the flow as being associated with a corresponding congestion event e.g., based on a quantity of traffic communicated over the flow during a time slot and a duration of the time slot. For example, for a flow associated with a congestion event, a first intermediary flow rate for the flow may be determined during a first time slot of a measurement window, a second intermediary flow rate for the flow may be determined during a second time slot of a measurement window, and so on. In some examples, final flow rates for the one or more flows during the measurement window may be determined. For example, for a flow associated with a congestion event, a final flow rate may be determined based on a largest intermediary flow rate, an average of the intermediary flow rates, a median of the intermediary flow rates, or a mean of the intermediary flow rates. In some examples, the final flow rate is generated based on a subset of the intermediary flow rates—e.g., an average of the top ninety (90) percent highest flow rates.

At block 430, speed records may be generated (e.g., by a gateway proxy or a client proxy) for one or more connections associated with the one or more flows based on the determined flow rates. A speed record may indicate (or be used to estimate) a calculated data rate of one or more corresponding flows during a measurement window. In some examples, flow rates determined for multiple flows during a measurement window may be used to calculate a data rate for a connection during the measurement window. In some examples, separate speed records may be generated for each of the one or more flows. In some examples, combined speed record may be generated for multiple flows—e.g., if the monitoring component (e.g., by a gateway proxy or a client proxy) is able to correlate flows associated with a same device or related devices up front (e.g., before post-processing). If a monitoring component can correlate flows up front, the monitoring component may combine flow rates (e.g., time-synchronized flow rates) computed for a set of flows associated with a service plan, a channel, a multi-user terminal (e.g., a modem on a transportation vehicle), or a combination thereof.

At block 435, an achievable data rate may be calculated for a connection between a user device and an access network, a connection between a multi-user device and an access network, a service plan, a channel, or any combination—e.g., by processing speed records associated with the connection. For a user device, a connection for the user device may support one or more flows. In some examples, a set of speed records (e.g., time-synchronized speed records) is generated for each of the one or more flows—e.g., based on respective congestion events occurring for the flows. Post-processing techniques may then be used to determine an achievable data rate for the connection based on aggregating the speed records—e.g., by adding the data rates of the speed records. In some examples, one speed record is generated for the one or more flows (e.g., using real-time correlation techniques)—e.g., based on a congestion event occurring for one of the flows. And the achievable data rate for the connection may be determined based on the speed record—e.g., based on a data rate of the speed record.

For a multi-user device that provides data services to one or more user devices, a connection for the multi-user device may support one or more flows to the one or more user devices. In some examples, a set of speed records (e.g., time-synchronized speed records) is generated for each of the one or more flows—e.g., based on respective congestion events occurring for the flows. Post-processing techniques may then be used to determine an achievable data rate for the connection of the multi-user device based on aggregating the speed records—e.g., by adding the data rates of the speed records. In some examples, the individual speed records of the set of speed records may be used to determine an achievable data rate of the user devices. In some examples, one speed record is generated for the one or more flows (e.g., using real-time correlation techniques)—e.g., based on a congestion event occurring for one of the flows. And the achievable data rate for the connection to the multi-user device may be determined based on the speed record—e.g., based on a data rate of the speed record. In some examples, when one speed record is generated, a set of speed records may also be generated for each of the one or more flows (or sets of flows), and achievable data rates of the connections to the user devices may also be determined as similarly described herein and above.

For a service plan (e.g., a residential plan, a commercial plan, etc.), a set of speed records (e.g., a set of speed records created within a time period) may be generated for each of the one or more flows associated with the service plan—e.g., based on respective congestion events occurring for the flows. Post-processing techniques may then be used to determine an achievable data rate for the service plan based on aggregating the speed records—e.g., by adding the data rates of the speed records. Or post-processing techniques may be used to determine a composite achievable data rate for the service plan based on combining the speed records—e.g., using an averaging, mean, or median function. In some examples, one speed record may be generated for the one or more flows associated with the service plan (e.g., using real-time correlation techniques)—e.g., based on a congestion event occurring for one of the flows. The achievable data rate for the service plan may then be determined based on the speed record—e.g., based on a data rate of the speed record. In some examples, the one speed record may be generated based on adding, averaging, applying a mean function, or applying a median function to the data rates determined for the one or more flows.

For a channel (or cell, sector, frequency range, or beam), a set of speed records (e.g., a set of speed records created within a time period) may be generated for each of the one or more flows associated with the channel—e.g. based on respective congestion events occurring for the flows. Post-processing techniques may then be used to determine an achievable data rate for the channel based on aggregating the speed records—e.g., by adding the data rates of the speed records. Or post-processing techniques may be used to determine a composite achievable data rate for the channel based on combining the speed records—e.g., using an averaging, mean, or median function. In some examples, one speed record may be generated for the one or more flows associated with the channel (e.g., using real-time correlation techniques)—e.g., based on a congestion event occurring for one of the flows. And the achievable data rate for the channel may be determined based on the speed record—e.g., based on a data rate of the speed record. In some examples, the one speed record may be generated based on adding, averaging, applying a mean function, or applying a median function to the data rates determined for the one or more flows.

In some examples, a set of speed records (or one speed record) may be generated for each of the one or more flows associated with a channel and a service plan, and either post-processing or real-time correlation techniques may similarly be used to determine an achievable data rate or an achievable composite data rate for the channel and service plan.

In some examples, a set of speed records (or one speed record) may be generated for each of the one or more flows associated with a subscriber (e.g., a subscriber that owns or provides service to multiple user devices), and either post-processing or real-time correlation techniques may similarly be used to determine an achievable data rate or an achievable composite data rate for the subscriber. In some examples, when one speed record is generated, a set of speed records may also be generated for each of the one or more flows, and achievable data rates of the connections to the user devices may also be determined as similarly described herein and above.

In some examples, multiple speed records are generated for a connection during a time period that includes multiple measurement windows. In some examples, the multiple speed records that occur during the time period may be processed (e.g., combined) to calculate an achievable data rate (e.g., an average achievable data rate) of the connection over the time period.

In some examples, a report including the estimated achievable data rates for individual user devices, individual multi-user devices, devices using a certain plan, devices using a certain channel, or any combination thereof may be determined based on the calculated achievable data rates.

Figure 5:
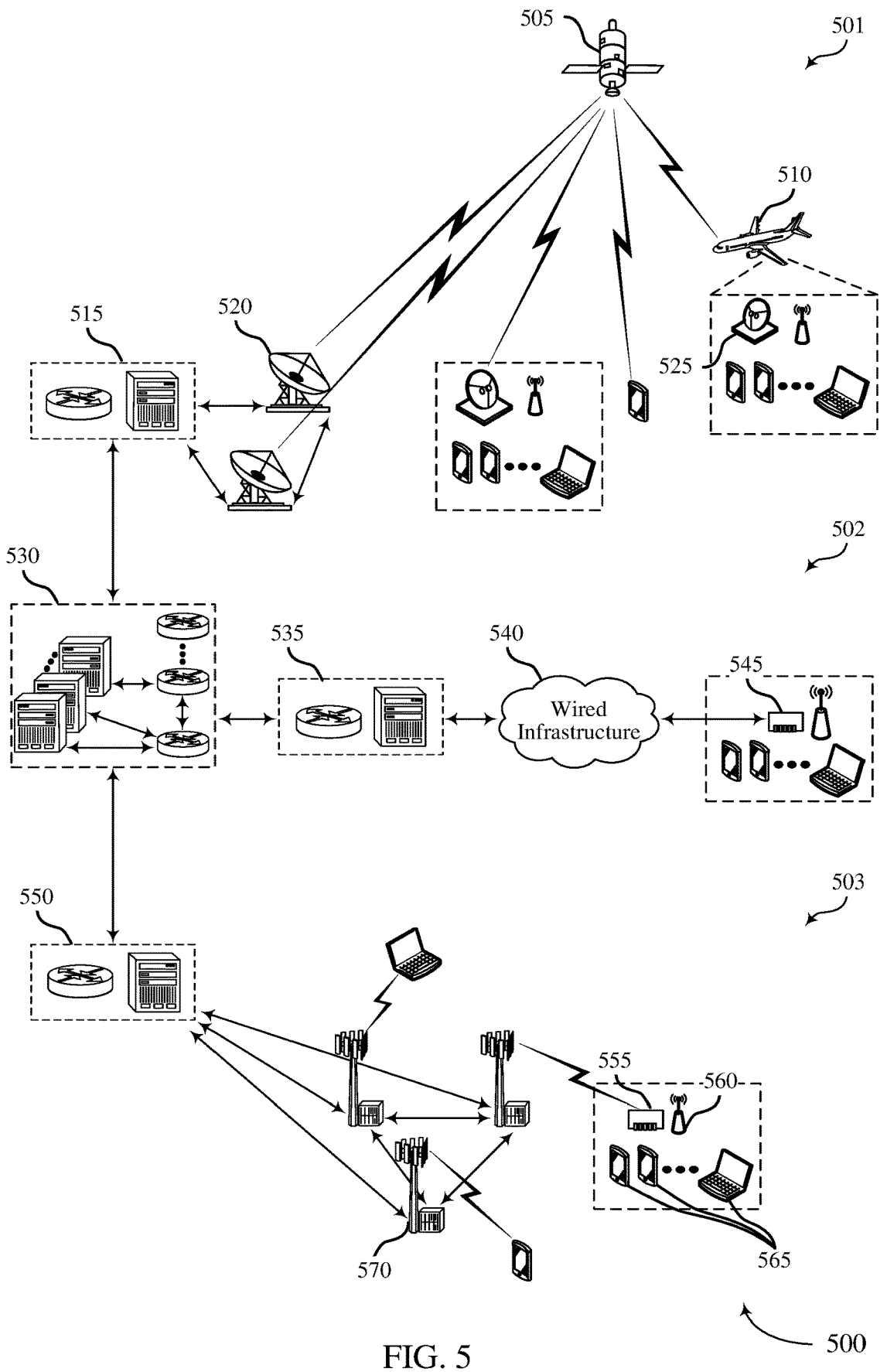
FIG. 5 shows a communications system that supports passive measurement of communication flows in accordance with examples as disclosed herein.

FIG. 5 shows a communications system that supports passive measurement of communication flows in accordance with examples as disclosed herein. Communications system 500 depicts multiple types of access networks, including satellite network 501, wired network 502, and cellular network 503. The multiple types of access networks may be used to access data network 530 and, in some examples, other access networks. In some examples, data network 530 represents a portion of the Internet, and is an example of data system 105-*a* of FIG. 1A.

Satellite network 501 may include satellite core network 515, a network of gateways (such as gateway 520), a network of satellites (such as satellite 505), satellite modems (such as satellite modem 525), and user devices. In some examples, satellite core network 515 include routing equipment and management servers. Satellite core network 515 may be configured to manage communications over satellite network 501 and to route communications to other networks, such as data network 530. Satellite core network 515 may also be configured to provide communications services to mobile vehicles, such as a bus, a train, a watercraft, aircraft 510, and the like. In some examples, a client-side modem of satellite network 501 (e.g., satellite modem 525) may be located at aircraft 510 and coupled with a router (e.g., a wireless router) used to provide communications services to multiple user devices.

In some examples, satellite core network 515, the gateways, the satellites, and the satellite modems may be components of an access system (such as access system 110-*a* of FIG. 1A). Also, the user devices and routers included in satellite network 501 may be examples of user devices 115-*a* of FIG. 1A.

Wired network 502 may include wired core network 535, wired infrastructure 540, and wired modems (such as wired modem 545). Wired core network 535 may include routing equipment and management servers use to manage and route communications. Wired infrastructure 540 may include a network of electrical cables, fiber-optic cables, telephone lines, or a combination thereof. In some examples, wired modems may be located on a customer's premises and coupled with a router (e.g., a wireless router) used to provide communications services to multiple user devices.

In some examples, wired core network 535, wired infrastructure 540, and the wired modems may be components of an access system (such as access system 110-*a* of FIG. 1A). Also, the user devices and routers included in wired network 502 may be examples of user devices 115-*a* of FIG. 1A.

Cellular network 503 may include cellular core network 550, a network of base stations (such as base station 570), and cellular modems (such as cellular modem 555). Cellular core network 550 may include routing equipment and management servers use to manage and route communications. The network of base stations may cover overlapping areas and be connected to one another via backhaul interfaces. In some examples, cellular modems may be located on a customer's premises and coupled with a router (e.g., such as router 560) used to provide communications services to user devices 565. Router 560 may be a wireless router, a wired router, or both.

In some examples, cellular core network 550, the base stations, and the cellular modems may be components of an access system (such as access system 110-*a* of FIG. 1A). Also, the user devices and routers included in cellular network 503 may be examples of user devices 115-*a* of FIG. 1A. In some examples, satellite modems, wired modems, and cellular modems may be examples of client proxy 160-*b* of FIG. 1B. In some examples, a communications system may include one of satellite network 501, wired network 502, cellular network 503, or a combination thereof.

Figure 6:
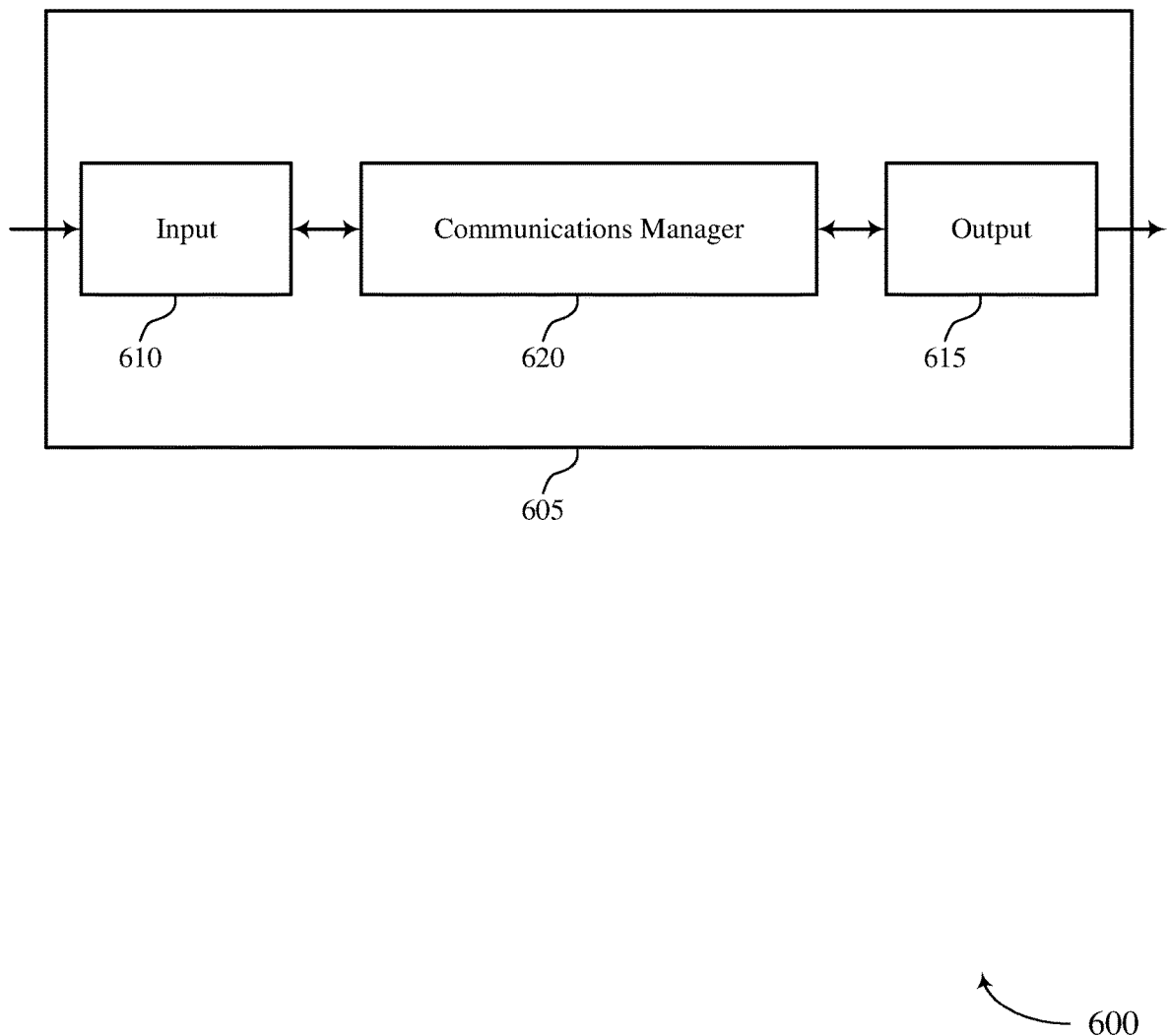
FIG. 6 shows a block diagram of a device that supports passive measurement of access network performance in accordance with examples as disclosed herein.

FIG. 6 shows a block diagram 600 of a device 605 that supports passive measurement of access network performance in accordance with examples as disclosed herein. The device 605 may be an example of aspects of a gateway proxy or client proxy as described herein. The device 605 may include an input 610, an output 615, and a communications manager 620. The device 605 may also include a processor. Each of these components may be in communication with one another (e.g., via one or more buses).

The input 610 may receive a flow that is transmitted over a portion of a connection between two nodes (e.g., over a data network connection or an access network connection). In some examples, the input 610 may include a traffic shaper or a similar component and may buffer data received over the flow to limit a data rate of the flow—e.g., for flows associated with devices having low data rate service plans.

The output 615 may output a flow over another portion of the connection between two nodes (e.g., over a data network connection or an access network connection). The output 615 may include a MAC component that may be used to buffer data before it is transmitted over the access network—e.g., to avoid exceeding a capacity of the access network.

The communications manager 620, the input 610, the output 615, or various combinations thereof or various components thereof may be examples of means for performing various aspects of passive measurement of access network performance as described herein. For example, the communications manager 620, the input 610, the output 615, or various combinations or components thereof may support a method for performing one or more of the functions described herein.

In some examples, the communications manager 620, the input 610, the output 615, or various combinations or components thereof may be implemented in hardware (e.g., in communications management circuitry). The hardware may include a processor, a DSP, an ASIC, an field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the input 610, the output 615, or various combinations or components thereof may be implemented in code (e.g., as communications management software or firmware) executed by a processor. If implemented in code executed by a processor, the functions of the communications manager 620, the input 610, the output 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the input 610, the output 615, or both. For example, the communications manager 620 may receive information from the input 610, send information to the output 615, or be integrated in combination with the input 610, the output 615, or both to receive information, transmit information, or perform various other operations as described herein.

The communications manager 620 may support communications in accordance with examples as disclosed herein. For example, the communications manager 620 may be configured as or otherwise support a means for monitoring, over a time period, a flow between a first node and a second node in a communication network. The communications manager 620 may be configured as or otherwise support a means for identifying a subset of the time period associated with communication of traffic for the flow being restricted by the communication network based at least in part on obtaining an indicator of congestion associated with the flow. The communications manager 620 may be configured as or otherwise support a means for determining a quantity of traffic for the flow for the subset of the time period based at least in part on the identifying. The communications manager 620 may be configured as or otherwise support a means for determining a flow rate for the subset of the time period based at least in part on determining the quantity of traffic of the flow for the subset of the time period. The communications manager 620 may be configured as or otherwise support a means for calculating a data rate of a connection between the first node and the second node over the communication network based at least in part on the flow rate.

Figure 7:
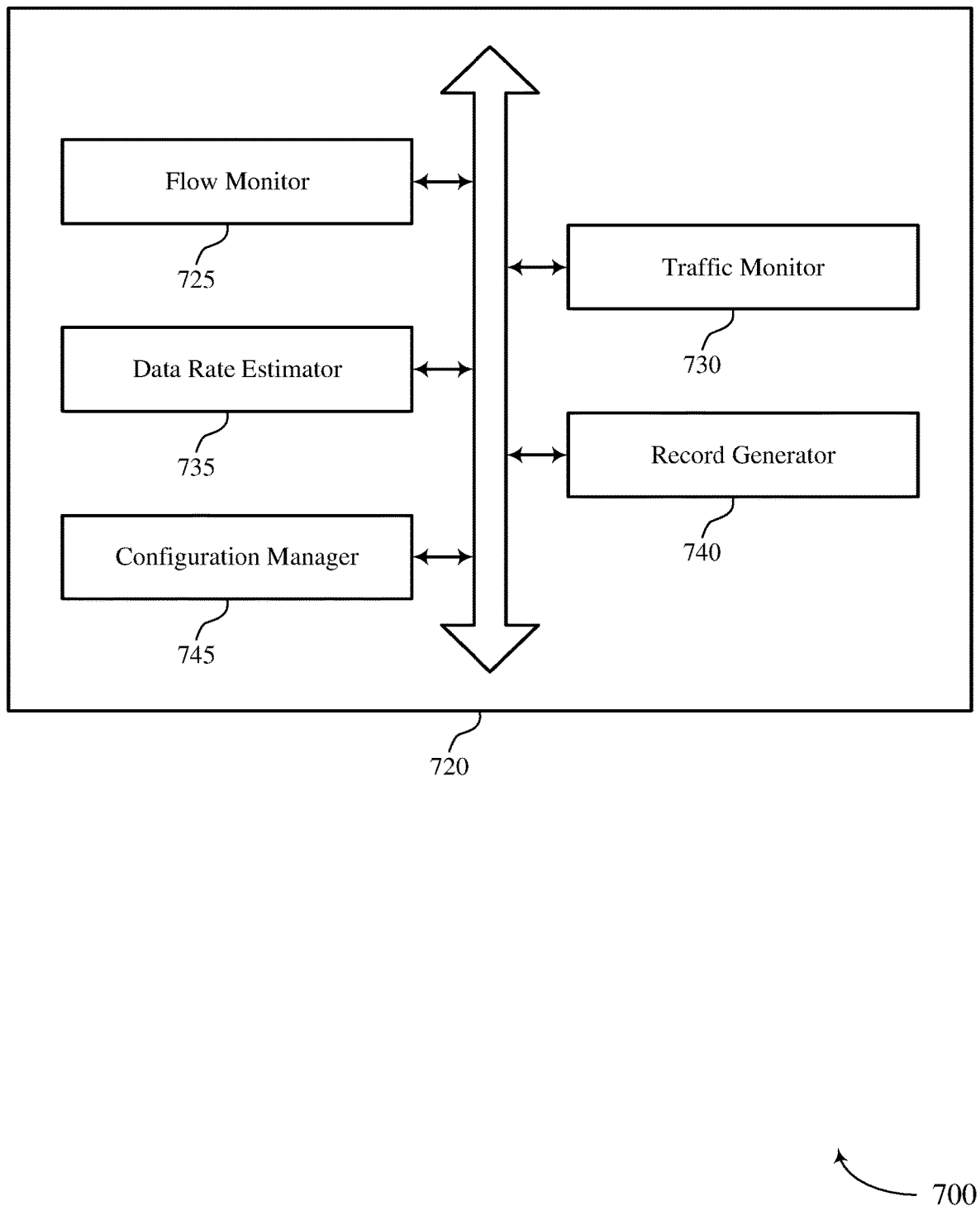
FIG. 7 shows a block diagram of a communications manager that supports passive measurement of access network performance in accordance with examples as disclosed herein.

FIG. 7 shows a block diagram 700 of a communications manager 720 that supports passive measurement of access network performance in accordance with aspects of the present disclosure. The communications manager 720 may be an example of aspects of a communications manager or a communications manager 620, or both, as described herein. The communications manager 720, or various components thereof, may be an example of means for performing various aspects of passive measurement of access network performance as described herein. For example, the communications manager 720 may include a flow monitor 725, a traffic monitor 730, a data rate estimator 735, a record generator 740, a configuration manager 745, or any combination thereof. Each of these components may communicate, directly or indirectly, with one another (e.g., via one or more buses).

The communications manager 720 may support communications in accordance with examples as disclosed herein. The flow monitor 725 may be configured as or otherwise support a means for monitoring, over a time period, a flow between a first node and a second node in a communication network. In some examples, the flow monitor 725 may be configured as or otherwise support a means for identifying a subset of the time period associated with communication of traffic for the flow being restricted by the communication network based at least in part on obtaining an indicator of congestion associated with the flow. The traffic monitor 730 may be configured as or otherwise support a means for determining a quantity of traffic for the flow for the subset of the time period based at least in part on the identifying. In some examples, the traffic monitor 730 may be configured as or otherwise support a means for determining a flow rate for the subset of the time period based at least in part on determining the quantity of traffic of the flow for the subset of the time period. The data rate estimator 735 may be configured as or otherwise support a means for calculating a data rate of a connection between the first node and the second node over the communication network based at least in part on the flow rate.

In some examples, to support obtaining the indicator of congestion associated with the flow, the flow monitor 725 may be configured as or otherwise support a means for determining a congestion event has occurred for the flow based at least in part on monitoring a congestion window of the flow, wherein the subset of the time period is identified based at least in part on determining the congestion event.

In some examples, to support determining the congestion event has occurred, the flow monitor 725 may be configured as or otherwise support a means for identifying a reduction in a size of the congestion window.

In some examples, to support determining the congestion event has occurred, the flow monitor 725 may be configured as or otherwise support a means for determining that a quantity of information in transit between the first node and the second node satisfies a threshold associated with a size of the congestion window for a duration satisfying a threshold duration.

In some examples, to support obtaining the indicator of congestion associated with the flow, the flow monitor 725 may be configured as or otherwise support a means for determining a congestion event has occurred for the flow based at least in part on a transmission buffer associated with the flow comprising at least one data packet for a duration satisfying a threshold duration, wherein the subset of the time period is identified based at least in part on determining the congestion event.

In some examples, the record generator 740 may be configured as or otherwise support a means for generating a record associated with the data rate of the connection based at least in part on calculating the flow rate, wherein the data rate of the connection is calculated based at least in part on the record.

In some examples, the record of the data rate of the connection is generated based at least in part on determining a congestion event has occurred for the flow, expiration of a timer associated with providing records for the flow, or determining the flow between the first node and the second node has been closed.

In some examples, the flow monitor 725 may be configured as or otherwise support a means for monitoring, over the time period, a plurality of flows between the first node and the second node, the plurality of flows comprising the flow. In some examples, the traffic monitor 730 may be configured as or otherwise support a means for determining respective quantities of traffic for the plurality of flows for the subset of the time period based at least in part on obtaining the indicator of congestion associated with the flow. In some examples, the traffic monitor 730 may be configured as or otherwise support a means for determining respective flow rates for the plurality of flows for the subset of the time period based at least in part on determining the respective quantities of traffic for the plurality of flows. In some examples, the data rate estimator 735 may be configured as or otherwise support a means for wherein calculating the data rate of the connection comprises calculating the data rate of the connection based at least in part on the respective flow rates.

In some examples, the traffic monitor 730 may be configured as or otherwise support a means for combining the respective flow rates determined for the plurality of flows during the subset of the time period. In some examples, the record generator 740 may be configured as or otherwise support a means for generating a record associated with the data rate of the connection based at least in part on combining the respective flow rates.

In some examples, the record generator 740 may be configured as or otherwise support a means for generating, for the connection, a plurality of records for a plurality of subsets of the time period, the plurality of records comprising a record associated with the data rate of the connection during the subset of the time period. In some examples, the data rate estimator 735 may be configured as or otherwise support a means for discarding a first subset of the plurality of records associated with a signal-to-noise ratio that is below a threshold, a second subset of the plurality of records associated with a handover operation, or both.

In some examples, the flow monitor 725 may be configured as or otherwise support a means for monitoring, over the time period, a plurality of flows between the first node and a plurality of nodes, the plurality of flows comprising the flow. In some examples, the record generator 740 may be configured as or otherwise support a means for generating a plurality of records associated with a plurality of connections between the first node and the plurality of nodes based at least in part on monitoring the plurality of flows.

In some examples, each of the plurality of records comprises a data rate for one of the plurality of connections, the data rate being determined from one or more respective flows of the plurality of flows based at least in part on a congestion event being identified for at least one flow of the plurality of flows.

In some examples, the data rate estimator 735 may be configured as or otherwise support a means for calculating a composite data rate for the plurality of connections between the first node and the plurality of nodes based at least in part on the plurality of records.

In some examples, the plurality of nodes are associated with a service plan of a plurality of service plans or a channel associated with the plurality of connections, and the data rate estimator 735 may be configured as or otherwise support a means for calculating a composite data rate for the service plan or the channel based at least in part on the plurality of records.

In some examples, to support calculating the composite data rate for the service plan or the channel, the data rate estimator 735 may be configured as or otherwise support a means for calculating, over a second time period, a plurality of data rates for the plurality of connections of the plurality of nodes based at least in part on a plurality of flow rates determined for the plurality of flows, the plurality of data rates comprising the data rate. In some examples, to support calculating the composite data rate for the service plan or the channel, the data rate estimator 735 may be configured as or otherwise support a means for using the plurality of data rates to obtain the composite data rate for the service plan or the channel during the second time period.

In some examples, the first node is coupled with a modem via a wireless communications network and the modem is coupled with the plurality of nodes, the plurality of nodes being user devices. In some examples, the plurality of nodes comprises the second node.

In some examples, a start of the time period occurs prior to, concurrent with, or after an occurrence of a congestion event in time and an end of the time period is based at least in part on a duration for which a quantity of information in transit satisfies a threshold.

In some examples, to support determining the flow rate, the traffic monitor 730 may be configured as or otherwise support a means for determining respective quantities of information communicated between the first node and the second node over one or more time slots that occur during the subset of the time period. In some examples, to support determining the flow rate, the traffic monitor 730 may be configured as or otherwise support a means for computing, for the one or more time slots, a set of intermediate flow rates based at least in part on the respective quantities of information communicated during the one or more time slots and corresponding durations of the one or more time slots, wherein the flow rate is based at least in part on the set of intermediate flow rates.

In some examples, the flow rate is estimated based at least in part on a largest of the set of intermediate flow rates, an average of the set of intermediate flow rates, an average of a portion of the set of intermediate flow rates, or any combination thereof.

In some examples, the configuration manager 745 may be configured as or otherwise support a means for activating, based at least in part on a quantity of network traffic satisfying a threshold, a first mode associated with calculating data rates of connections by monitoring flows associated with the connections. In some examples, the configuration manager 745 may be configured as or otherwise support a means for activating, based at least in part on the quantity of network traffic being below the threshold, a second mode associated with calculating data rates of the connections by transmitting a plurality of packets over the flows associated with the connections.

In some examples, the communication network comprises a terrestrial network, a satellite network, a wireless network, a wired network, a cellular network, or any combination thereof.

Figure 8:
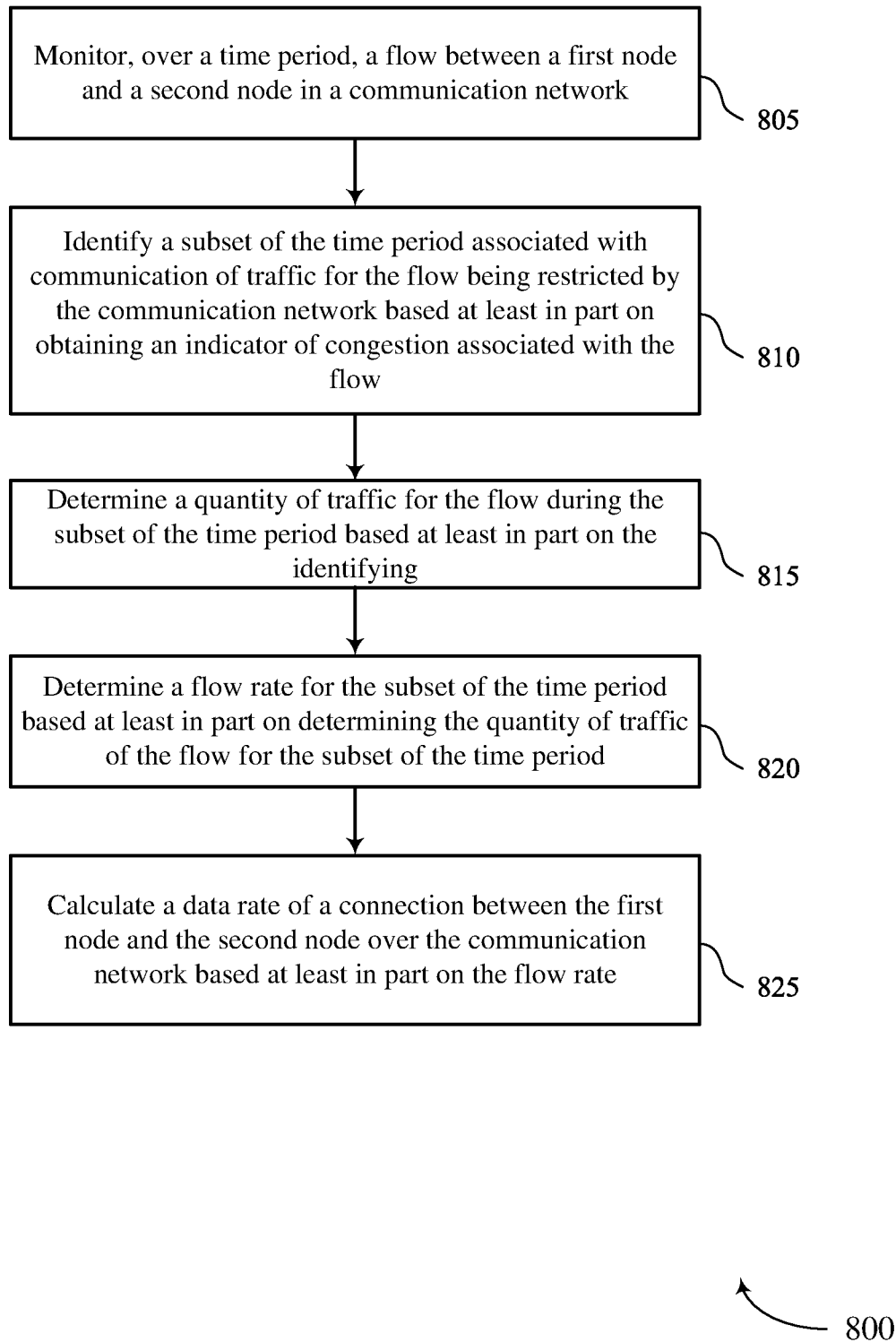
FIG. 8 shows a flowchart illustrating a method that supports passive measurement of access network performance in accordance with examples as disclosed herein.

FIG. 8 shows a flowchart illustrating a method 800 that supports passive measurement of access network performance in accordance with examples as disclosed herein. The operations of the method 800 may be implemented by a proxy or its components as described herein. For example, the operations of the method 800 may be performed by a proxy as described with reference to FIGS. 1 through 7. In some examples, a proxy may execute a set of instructions to control the functional elements of the proxy to perform the described functions. Additionally, or alternatively, the proxy may perform aspects of the described functions using special-purpose hardware.

At 805, the method may include monitoring, over a time period, a flow between a first node and a second node in a communication network. The operations of 805 may be performed in accordance with examples as disclosed herein. In some examples, aspects of the operations of 805 may be performed by a flow monitor 725 as described with reference to FIG. 7.

At 810, the method may include identifying a subset of the time period associated with communication of traffic for the flow being restricted by the communication network based at least in part on obtaining an indicator of congestion associated with the flow. The operations of 810 may be performed in accordance with examples as disclosed herein. In some examples, aspects of the operations of 810 may be performed by a flow monitor 725 as described with reference to FIG. 7.

At 815, the method may include determining a quantity of traffic for the flow for the subset of the time period based at least in part on the identifying. The operations of 815 may be performed in accordance with examples as disclosed herein. In some examples, aspects of the operations of 815 may be performed by a traffic monitor 730 as described with reference to FIG. 7.

At 820, the method may include determining a flow rate for the subset of the time period based at least in part on determining the quantity of traffic of the flow for the subset of the time period. The operations of 820 may be performed in accordance with examples as disclosed herein. In some examples, aspects of the operations of 820 may be performed by a traffic monitor 730 as described with reference to FIG. 7.

At 825, the method may include calculating a data rate of a connection between the first node and the second node over the communication network based at least in part on the flow rate. The operations of 825 may be performed in accordance with examples as disclosed herein. In some examples, aspects of the operations of 825 may be performed by a data rate estimator 735 as described with reference to FIG. 7.

In some examples, an apparatus as described herein may perform a method or methods, such as the method 800. The apparatus may include, features, circuitry, logic, means, or instructions (e.g., a non-transitory computer-readable medium storing instructions executable by a processor) for monitoring, over a time period, a flow between a first node and a second node in a communication network, identifying a subset of the time period associated with communication of traffic for the flow being restricted by the communication network based at least in part on obtaining an indicator of congestion associated with the flow, determining a quantity of traffic for the flow for the subset of the time period based at least in part on the identifying, determining a flow rate for the subset of the time period based at least in part on determining the quantity of traffic of the flow for the subset of the time period, and calculating a data rate of a connection between the first node and the second node over the communication network based at least in part on the flow rate.

In some examples of the method 800 and the apparatus described herein, obtaining the indicator of congestion associated with the flow may include operations, features, circuitry, logic, means, or instructions for determining a congestion event may have occurred for the flow based at least in part on monitoring a congestion window of the flow, where the subset of the time period may be identified based at least in part on determining the congestion event.

In some examples of the method 800 and the apparatus described herein, determining the congestion event may have occurred may include operations, features, circuitry, logic, means, or instructions for identifying a reduction in a size of the congestion window.

In some examples of the method 800 and the apparatus described herein, determining the congestion event may have occurred may include operations, features, circuitry, logic, means, or instructions for determining that a quantity of information in transit between the first node and the second node satisfies a threshold associated with a size of the congestion window for a duration satisfying a threshold duration.

In some examples of the method 800 and the apparatus described herein, obtaining the indicator of congestion associated with the flow may include operations, features, circuitry, logic, means, or instructions for determining a congestion event may have occurred for the flow based at least in part on a transmission buffer associated with the flow including at least one data packet for a duration satisfying a threshold duration, where the subset of the time period may be identified based at least in part on determining the congestion event.

Some examples of the method 800 and the apparatus described herein may further include operations, features, circuitry, logic, means, or instructions for generating a record associated with the data rate of the connection based at least in part on calculating the flow rate, where the data rate of the connection may be calculated based at least in part on the record.

In some examples of the method 800 and the apparatus described herein, the record of the data rate of the connection may be generated based at least in part on determining a congestion event may have occurred for the flow, expiration of a timer associated with providing records for the flow, or determining the flow between the first node and the second node may have been closed.

Some examples of the method 800 and the apparatus described herein may further include operations, features, circuitry, logic, means, or instructions for monitoring, over the time period, a plurality of flows between the first node and the second node, the plurality of flows including the flow, determining respective quantities of traffic for the plurality of flows for the subset of the time period based at least in part on obtaining the indicator of congestion associated with the flow, determining respective flow rates for the plurality of flows for the subset of the time period based at least in part on determining the respective quantities of traffic for the plurality of flows, and where calculating the data rate of the connection includes calculating the data rate of the connection based at least in part on the respective flow rates.

Some examples of the method 800 and the apparatus described herein may further include operations, features, circuitry, logic, means, or instructions for combining the respective flow rates determined for the plurality of flows during the subset of the time period and generating a record associated with the data rate of the connection based at least in part on combining the respective flow rates.

In some examples of the method 800 and the apparatus described herein, generating, for the connection, a plurality of records for a plurality of subsets of the time period, the plurality of records including a record associated with the data rate of the connection during the subset of the time period and discarding a first subset of the plurality of records associated with a signal-to-noise ratio that may be below a threshold, a second subset of the plurality of records associated with a handover operation, or both.

Some examples of the method 800 and the apparatus described herein may further include operations, features, circuitry, logic, means, or instructions for monitoring, over the time period, a plurality of flows between the first node and a plurality of nodes, the plurality of flows including the flow and generating a plurality of records associated with a plurality of connections between the first node and the plurality of nodes based at least in part on monitoring the plurality of flows.

In some examples of the method 800 and the apparatus described herein, each of the plurality of records includes a data rate for one of the plurality of connections, the data rate being determined from one or more respective flows of the plurality of flows based at least in part on a congestion event being identified for at least one flow of the plurality of flows.

Some examples of the method 800 and the apparatus described herein may further include operations, features, circuitry, logic, means, or instructions for calculating a composite data rate for the plurality of connections between the first node and the plurality of nodes based at least in part on the plurality of records.

In some examples of the method 800 and the apparatus described herein, the plurality of nodes may be associated with a service plan of a plurality of service plans or a channel associated with the plurality of connections and the method, apparatuses, and non-transitory computer-readable medium may include further operations, features, circuitry, logic, means, or instructions for calculating a composite data rate for the service plan or the channel based at least in part on the plurality of records.

In some examples of the method 800 and the apparatus described herein, calculating the composite data rate for the service plan or the channel may include operations, features, circuitry, logic, means, or instructions for calculating, over a second time period, a plurality of data rates for the plurality of connections of the plurality of nodes based at least in part on a plurality of flow rates determined for the plurality of flows, the plurality of data rates including the data rate and using the plurality of data rates to obtain the composite data rate for the service plan or the channel during the second time period.

In some examples of the method 800 and the apparatus described herein, the first node may be coupled with a modem via a wireless communications network and the modem may be coupled with the plurality of nodes, the plurality of nodes being user devices, and wherein the plurality of nodes includes the second node.

In some examples of the method 800 and the apparatus described herein, a start of the time period occurs prior to, concurrent with, or after an occurrence of a congestion event in time and an end of the time period may be based at least in part on a duration for which a quantity of information in transit satisfies a threshold.

In some examples of the method 800 and the apparatus described herein, determining the flow rate may include operations, features, circuitry, logic, means, or instructions for determining respective quantities of information communicated between the first node and the second node over one or more time slots that occur during the subset of the time period and computing, for the one or more time slots, a set of intermediate flow rates based at least in part on the respective quantities of information communicated during the one or more time slots and corresponding durations of the one or more time slots, where the flow rate may be based at least in part on the set of intermediate flow rates.

In some examples of the method 800 and the apparatus described herein, the flow rate may be estimated based at least in part on a largest of the set of intermediate flow rates, an average of the set of intermediate flow rates, an average of a portion of the set of intermediate flow rates, or any combination thereof.

In some examples of the method 800 and the apparatus described herein, activating, based at least in part on a quantity of network traffic satisfying a threshold, a first mode associated with calculating data rates of connections by monitoring flows associated with the connections and activating, based at least in part on the quantity of network traffic being below the threshold, a second mode associated with calculating data rates of the connections by transmitting a plurality of packets over the flows associated with the connections.

In some examples of the method 800 and the apparatus described herein, the communication network includes a terrestrial network, a satellite network, a wireless network, a wired network, a cellular network, or any combination thereof.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for communications, comprising:
   monitoring, over a time period, a plurality of flows between a first node and a second node that are associated with an access system, a connection between the first node and the second node over the access system comprising the plurality of flows;
   identifying a subset of the time period associated with communication of traffic for a flow of the plurality of flows being restricted by the access system based at least in part on obtaining an indicator of congestion for the flow;
   determining a quantity of traffic for each flow of the plurality of flows during the subset of the time period based at least in part on obtaining the indicator of congestion for the flow;
   determining, for the plurality of flows, a plurality of flow rates for the subset of the time period based at least in part on determining respective quantities of traffic of the flow for the subset of the time period, wherein determining the plurality of flow rates comprises:
      determining respective quantities of information communicated between the first node and the second node over one or more time slots that occur during the subset of the time period, and
      computing, for the one or more time slots, a set of intermediate flow rates based at least in part on the respective quantities of information communicated during the one or more time slots and corresponding durations of the one or more time slots, wherein the plurality of flow rates are based at least in part on the set of intermediate flow rates; and
   calculating a capacity of the connection for a second time period based at least in part on the plurality of flow rates.

2. The method of claim 1, wherein obtaining the indicator of congestion associated with the flow comprises:
   determining a congestion event has occurred for the flow based at least in part on monitoring a congestion window of the flow, wherein the subset of the time period is identified based at least in part on determining the congestion event.

3. The method of claim 2, wherein determining the congestion event has occurred comprises:
   identifying a reduction in a size of the congestion window.

4. The method of claim 2, wherein determining the congestion event has occurred comprises:
   determining that a quantity of information in transit between the first node and the second node satisfies a threshold associated with a size of the congestion window for a duration satisfying a threshold duration.

5. The method of claim 1, wherein obtaining the indicator of congestion associated with the flow comprises:
   determining a congestion event has occurred for the flow based at least in part on a transmission buffer associated with the flow comprising unsent data for a threshold duration, wherein the subset of the time period is identified based at least in part on determining the congestion event.

6. The method of claim 1, further comprising:
generating a record based at least in part on determining the plurality of flow rates, wherein the capacity of the connection is calculated based at least in part on the record.

7. The method of claim 6, wherein the record is generated based at least in part on determining a congestion event has occurred for the flow, an expiration of a timer associated with providing records for the plurality of flows, or determining the flow between the first node and the second node has been closed.

8. The method of claim 1, further comprising:
combining the flow rates of the plurality of flows determined for the plurality of flows during the subset of the time period; and
generating a record comprising a data rate of the connection during the subset of the time period based at least in part on combining the flow rates, wherein the capacity of the connection is calculated based at least in part on the data rate.

9. The method of claim 1, further comprising:
generating, for the connection, a plurality of records for a plurality of subsets of the time period, the plurality of records comprising a record comprising a data rate of the connection during the subset of the time period; and
discarding a first subset of the plurality of records associated with a signal-to-noise ratio that is below a threshold, a second subset of the plurality of records associated with a handover operation, or both.

10. The method of claim 1, further comprising:
monitoring, over the time period, a second plurality of flows between the first node and a plurality of nodes comprising the second node, wherein a plurality of connections between the first node and the plurality of nodes comprises the connection between the first node and the second node, wherein each connection of the plurality of connections comprises a respective group of the second plurality of flows, and wherein the group of the second plurality of flows comprised by the connection between the first node and the second node is the plurality of flows; and
generating, for each connection of the plurality of connections, one or more records based at least in part on flow rates determined for corresponding groups of the second plurality of flows.

11. The method of claim 10, further comprising:
determining, for each group of the second plurality of flows, one or more sets of flow rates in response to one or more congestion events being identified for at least one flow in each of the groups of the second plurality of flows; and
determining, for each connection of the plurality of connections, one or more data rates based at least in part on the one or more sets of flow rates determined for the corresponding groups of the second plurality of flows, wherein the one or more records generated for the plurality of connections comprise the data rates determined for the corresponding groups of the second plurality of flows.

12. The method of claim 11, further comprising:
calculating a composite capacity for each connection of the plurality of connections between the first node and the plurality of nodes based at least in part on the data rates included in corresponding records of the records generated for the plurality of connections.

13. The method of claim 11, wherein the plurality of nodes have a subscription to use a service plan of a plurality of service plans, the method further comprising:
calculating a composite capacity for the service plan based at least in part on the data rates included in the one or more records generated for the plurality of connections associated with the plurality of nodes.

14. The method of claim 13, wherein calculating the composite capacity for the service plan comprises:
calculating, over a third time period, data rates for the plurality of connections based at least in part on flow rates determined for groups of the second plurality of flows; and
combining the data rates to obtain the composite capacity for the service plan during the third time period.

15. The method of claim 10, wherein the plurality of nodes are associated with a channel of a plurality of service plans associated with the plurality of connections, the method further comprising:
calculating a composite capacity for the channel based at least in part on the one or more records generated for the plurality of connections.

16. The method of claim 10, wherein the first node is coupled with a modem via a wireless communications network and the modem is coupled with the plurality of nodes, the plurality of nodes being user devices.

17. The method of claim 1, wherein a start of the subset of the time period occurs prior to, concurrent with, or after an occurrence of a congestion event in time and an end of the subset of the time period is based at least in part on a duration for which a quantity of information in transit satisfies a threshold.

18. A method for communications, comprising:
monitoring, over a time period, a flow between a first node and a second node that are associated with an access system;
identifying a subset of the time period associated with communication of traffic for the flow being restricted by the access system based at least in part on obtaining an indicator of congestion associated with the flow;
determining a quantity of traffic for the flow during the subset of the time period based at least in part on the identifying;
determining a flow rate for the subset of the time period based at least in part on determining the quantity of traffic of the flow for the subset of the time period; and
calculating a data rate of a connection between the first node and the second node over the access system based at least in part on the flow rate, wherein determining the flow rate comprises:
determining respective quantities of information communicated between the first node and the second node over one or more time slots that occur during the subset of the time period; and
computing, for the one or more time slots, a set of intermediate flow rates based at least in part on the respective quantities of information communicated during the one or more time slots and corresponding durations of the one or more time slots, wherein the flow rate is based at least in part on the set of intermediate flow rates.

19. The method of claim 1, wherein the plurality of flow rates are estimated based at least in part on a largest of the set of intermediate flow rates, an average of the set of intermediate flow rates, an average of a portion of the set of intermediate flow rates, or any combination thereof.

20. The method of claim 1, further comprising:
activating, based at least in part on a quantity of network traffic satisfying a threshold, a first mode associated with calculating capacities of connections by monitoring flows associated with the connections; and
activating, based at least in part on the quantity of network traffic being below the threshold, a second mode associated with calculating capacities of the connections by transmitting a plurality of packets over the flows associated with the connections.

21. The method of claim 1, wherein the access system comprises a terrestrial network, a non-terrestrial network, a satellite network, a wireless network, a wired network, a cellular network, or any combination thereof.

* * * * *